United States Patent
Nose

(10) Patent No.: US 12,503,551 B2
(45) Date of Patent: Dec. 23, 2025

(54) FLUORINE-CONTAINING ISOCYANUL COMPOUND

(71) Applicant: DAIKIN INDUSTRIES, LTD., Osaka (JP)

(72) Inventor: Masatoshi Nose, Cheonan-si (KR)

(73) Assignee: DAIKIN INDUSTRIES, LTD., Osaka (JP)

( * ) Notice: Subject to any disclaimer, the term of this patent is extended or adjusted under 35 U.S.C. 154(b) by 942 days.

(21) Appl. No.: 17/649,566

(22) Filed: Feb. 1, 2022

(65) Prior Publication Data

US 2022/0204690 A1   Jun. 30, 2022

Related U.S. Application Data

(63) Continuation of application No. PCT/JP2020/029570, filed on Jul. 31, 2020.

(30) Foreign Application Priority Data

| Aug. 2, 2019 | (JP) | 2019-143218 |
| Sep. 11, 2019 | (JP) | 2019-165215 |
| Dec. 19, 2019 | (JP) | 2019-228924 |
| Apr. 23, 2020 | (JP) | 2020-076866 |

(51) Int. Cl.
| *C08G 65/00* | (2006.01) |
| *C07D 251/32* | (2006.01) |
| *C09D 4/00* | (2006.01) |
| *C09D 5/16* | (2006.01) |

(52) U.S. Cl.
CPC ......... *C08G 65/007* (2013.01); *C07D 251/32* (2013.01); *C09D 4/00* (2013.01); *C09D 5/1662* (2013.01)

(58) Field of Classification Search
CPC ... C08G 65/007; C07D 251/32; C07D 251/07
See application file for complete search history.

(56) References Cited

U.S. PATENT DOCUMENTS

| 2004/0181008 A1 | 9/2004 | Hanazawa et al. |
| 2020/0024241 A1 | 1/2020 | Yamashita et al. |

FOREIGN PATENT DOCUMENTS

| WO | 03/002628 A1 | 1/2003 | |
| WO | 2018/056413 A1 | 3/2018 | |
| WO | WO2018/056413 | * 3/2018 | ........... C07D 405/06 |

OTHER PUBLICATIONS

International Search Report for PCT/JP2020/029570 dated Oct. 20, 2020 (PCT/ISA/210).
International Preliminary Report on Patentability dated Feb. 8, 2022 with a Translation of the Written Opinion of the International Searching Authority in Application No. PCT/JP2020/029570.
Extended European Search Report dated May 31, 2023 in European Application No. 20850700.4.

* cited by examiner

*Primary Examiner* — Paul V Ward
(74) *Attorney, Agent, or Firm* — Sughrue Mion, PLLC

(57) ABSTRACT

A compound of formula (I) having the structure shown below:

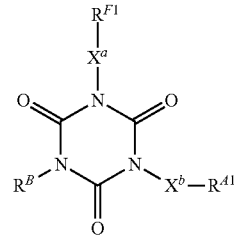

(1)

wherein $R^B$, $R^{F1}$, $R^{A1}$, $X^a$ and $X^b$ are as defined herein.

11 Claims, No Drawings

FLUORINE-CONTAINING ISOCYANUL COMPOUND

CROSS REFERENCE TO RELATED APPLICATIONS

This application is a Rule 53 (b) Continuation of International Application No.PCT/JP2020/029570 filed Jul. 31, 2020, claiming priority based on Japanese Patent Application No. 2019-143218 filed Aug. 2, 2019, Japanese Patent Application No. 2019-165215 filed Sep. 11, 2019, Japanese Patent Application No. 2019-228924 filed Dec. 19, 2019 and Japanese Patent Application No. 2020-076866 filed Apr. 23, 2020, the respective disclosures of which are incorporated herein by reference in their entirety.

TECHNICAL FIELD

The present disclosure relates to a fluorine-containing isocyanul compound and a composition containing the fluorinated isocyanul compound.

BACKGROUND ART

It is known that certain fluorine-containing compounds can provide excellent water-repellency, oil-repellency, antifouling property, and the like when used for surface treatment of a substrate. As such a fluorine-containing compound, (A) triisocyanate obtained by trimerizing diisocyanate, (B-1) perfluoropolyether having at least one active hydrogen, and (B-2) a fluorine-containing compound obtained by reacting a monomer having an active hydrogen and a carbon-carbon double bond are known (Patent Literature 1).

CITATION LIST

Patent Literature

Patent Literature 1: WO2003/002628A1

SUMMARY

[1] A compound of the following formula (1):

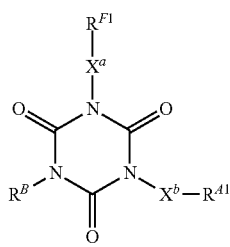

wherein:
$R^{F1}$ is $Rf^1$—$R^F$—$O_q$—;
$Rf^1$ is a $C_{1-16}$ alkyl group optionally substituted with one or more fluorine atoms;
$R^F$ is a divalent fluoropolyether group;
q is 0 or 1;
$X^a$ is a single bond or divalent organic group;
$R^{A1}$ is an ORAL group-containing group;
$R^{Ac}$ is a (meth)acryloyl group;
$X^b$ is a divalent organic group containing at least two heteroatoms; and
$R^B$ is $R^{F1}$—$X^a$— or $R^{A1}$—$X^b$—.

ADVANTAGEOUS EFFECT

A fluorine-containing isocyanul compound of the present disclosure can provide a surface-treating layer having water-repellency, oil-repellency and antifouling property, and having high friction durability to a substrate made of various materials including a resin, and can be suitably used as a surface-treating agent.

DESCRIPTION OF EMBODIMENTS

As used herein, the "organic group" means a monovalent group containing carbon. Unless otherwise specified, the monovalent organic group may be a hydrocarbon group or a derivative thereof. A derivative of a hydrocarbon group means a group having one or more of N, O, S, Si, amide, sulfonyl, sulfoxide, siloxane, carbonyl, carbonyloxy and the like at an end or in a molecular chain of the hydrocarbon group. Further, the "divalent organic group" means a divalent group containing carbon. Such a divalent organic group is not limited, and examples thereof include a divalent group obtained by removing one hydrogen atom from the organic group.

As used herein, the "hydrocarbon group" means a group containing carbon and hydrogen, which is a group obtained by removing one hydrogen atom from hydrocarbon. Such a hydrocarbon group is not limited, and examples thereof include a $C_{1-20}$ hydrocarbon group such as an aliphatic hydrocarbon group and an aromatic hydrocarbon group, which may be substituted with one or more substituents. The "aliphatic hydrocarbon group" may be linear, branched or cyclic, and may be saturated or unsaturated. Further, the hydrocarbon group may contain one or more ring structures.

As used herein, examples of the substituent of the "hydrocarbon group" include, but not limited to, a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group and a 5 to 10-membered heteroaryl group each optionally substituted with one or more halogen atoms.

Hereinafter, a fluorine-containing isocyanul compound of the present disclosure will be described.

The present disclosure provides a compound of the following formula (1) or formula (2):

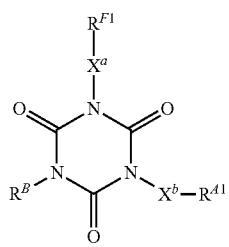

-continued

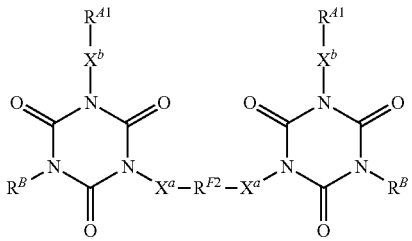
(2)

wherein:
$R^{F1}$ is $Rf^1-R^F-O_q-$;
$R^{F2}$ is $-Rf^2{}_p-R^F-O_q-$;
$Rf^1$ is a $C_{1-16}$ alkyl group optionally substituted with one or more fluorine atoms;
$Rf^2$ is a $C_{1-6}$ alkylene group optionally substituted with one or more fluorine atoms;
$R^F$ is a divalent fluoropolyether group;
p is 0 or 1;
q is 0 or 1;
$X^a$ is each independently at each occurrence a single bond or a divalent organic group;
$R^{A1}$ is each independently at each occurrence an $OR^{Ac}$ group-containing group;
$R^{Ac}$ is a (meth)acryloyl group;
$X^b$ is a divalent organic group containing at least two heteroatoms; and
$R^B$ is each independently at each occurrence $R^{F1}-X^a-$ or $R^{A1}-X^b-$.

In the formula (1), $R^{F1}$ is $Rf^1-R^F-O_q-$.
In the formula (2), $R^{F2}$ is $-Rf^2{}_p-R^F-O_q-$.
In the formula, $Rf^1$ is a $C_{1-16}$ alkyl group optionally substituted with one or more fluorine atoms.

The "$C_{1-16}$ alkyl group" in the $C_{1-16}$ alkyl group optionally substituted with one or more fluorine atoms may be linear or branched, and is preferably a linear or branched $C_{1-6}$ alkyl group, particularly a $C_{1-3}$ alkyl group, more preferably a linear $C_{1-6}$ alkyl group, and particularly a $C_{1-3}$ alkyl group.

$Rf^1$ is preferably a $C_{1-16}$ alkyl group substituted with one or more fluorine atoms, more preferably a $CF_2H-C_{1-15}$ perfluoroalkylene group, and still more preferably a $C_{1-16}$ perfluoroalkyl group.

The $C_{1-16}$ perfluoroalkyl group may be linear or branched, and is preferably a linear or branched $C_{1-6}$ perfluoroalkyl group, particularly $C_{1-3}$ perfluoroalkyl group, more preferably a linear $C_{1-6}$ perfluoroalkyl group, and particularly $C_{1-3}$ perfluoroalkyl group; specifically, $-CF_3$, $-CF_2CF_3$, or $-CF_2CF_2CF_3$.

In the formula, $Rf^2$ is a $C_{1-6}$ alkylene group optionally substituted with one or more fluorine atoms.

The "$C_{1-6}$ alkylene group" in the $C_{1-6}$ alkylene group optionally substituted with one or more fluorine atoms may be linear or branched, and is preferably a linear or branched $C_{1-3}$ alkylene group, and more preferably a linear $C_{1-3}$ alkylene group.

$Rf^2$ is preferably a $C_{1-6}$ alkylene group substituted with one or more fluorine atoms, more preferably a $C_{1-6}$ perfluoroalkylene group, and still more preferably a $C_{1-3}$ perfluoroalkylene group.

The $C_{1-6}$ perfluoroalkylene group may be linear or branched, and is preferably a linear or branched $C_{1-3}$ perfluoroalkylene group, and more preferably a linear $C_{1-3}$ perfluoroalkyl group; specifically, $-CF_2-$, $-CF_2CF_2-$ or $-CF_2CF_2CF_2-$.

In the formula, p is 0 or 1. In one embodiment, p is 0. In another embodiment, p is 1.

In the formula, q is 0 or 1. In one embodiment, q is 0. In another embodiment, q is 1.

In the formulas (1) and (2), $R^F$ is each independently a divalent fluoropolyether group.

$R^F$ is preferably a group of the following formula:

$$(OC_6F_{12})_a-(OC_5F_{10})_b-(OC_4F_8)_c-(OC_3R^{Fa}{}_6)_d-(OC_2F_4)_e-(OCF_2)_f-$$

wherein:
$R^{Fa}$ is each independently at each occurrence a hydrogen atom, a fluorine atom, or a chlorine atom;
a, b, c, d, e, and f are each independently an integer of 0 to 200, the sum of a, b, c, d, e, and f is 1 or more; and the occurrence order of the respective repeating units in parenthesis with a, b, c, d, e, or f, is not limited in the formula.

$R^{Fa}$ is preferably a hydrogen atom or a fluorine atom, and more preferably a fluorine atom.

a, b, c, d, e and f may preferably each independently be an integer of 0 to 100.

The sum of a, b, c, d, e, and f is preferably 5 or more, more preferably 10 or more, for example, 15 or more, and 20 or more. The sum of a, b, c, d, e, and f is preferably 200 or less, more preferably 100 or less, still more preferably 60 or less, and may be, for example, 50 or less or 30 or less.

These repeating units may be linear or branched. For example, as the repeating unit, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like. $(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, $-(OC_3F_6)-$ (that is, $R^{Fa}$ is a fluorine atom in the formula) may be any of $-(OCF_2CF_2CF_2)-$, $-(OCF(CF_3)CF_2)-$, and $-(OCF_2CF(CF_3))-$. $-(OC_2F_4)-$ may be any of $-(OCF_2CF_2)-$ and $-(OCF(CF_3))-$.

In one embodiment, the repeating unit is linear. When the repeating unit is linear, the surface lubricity, friction durability, and the like of the surface-treating layer can be improved.

In one embodiment, the repeating unit is branched. When the repeating unit is branched, the dynamic friction coefficient of the surface-treating layer can be increased.

In one embodiment, $R^F$ is each independently a group of any one of the following formulas (f1) to (f5):

$$-(OC_3F_6)_d \quad (f1)$$

wherein d is an integer from 1 to 200, $$(OC_4F_8)_c-(OC_3F_6)_d-(OC_2F_4)_e-(OCF_2)_f- \quad (f2)$$

wherein c and d are each independently an integer of 0 or more and 30 or less, and e and f are each independently an integer of 1 or more and 200 or less;

the sum of c, d, e, and f is an integer of 2 or more; and
the occurrence order of the repeating units in parenthesis with the subscription c, d, e, or f is not limited in the formula;

  (f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or alternatively a combination of two or three groups independently selected from these groups; and
g is an integer of 2 to 100;

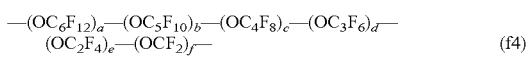  (f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parenthesis with a, b, c, d, e, or f, is not limited in the formula; and

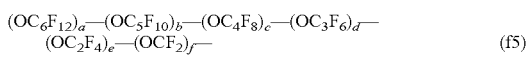  (f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parenthesis with a, b, c, d, e, or f, is not limited in the formula.

In the formula (f1), d is preferably an integer of 5 to 200, more preferably 10 to 100, still more preferably 15 to 50, for example 25 to 35. The formula (f1) is preferably a group of —$(OCF_2CF_2CF_2)_d$— or —$(OCF(CF_3)CF_2)_d$—, and more preferably a group of —$(OCF_2CF_2CF_2)_d$—.

In the formula (f2), e and f are each independently an integers of preferably 5 or more and 200 or less, and more preferably 10 to 200. Further, the sum of c, d, e, and f is preferably 5 or more, more preferably 10 or more, for example, 15 or more and 20 or more. In one embodiment, the formula (f2) is preferably a group of —$(OCF_2CF_2CF_2CF_2)_c$—$(OCF_2CF_2CF_2)_d$—$(OCF_2CF_2)_e$—$(OCF_2)_f$—. In another embodiment, the formula (f2) may be a group of —$(OC_2F_4)_e$—$(OCF_2)_f$—.

In the formula (f3), $R^6$ is preferably $OC_2F_4$. In the formula (f3), $R^7$ is preferably a group selected from $OC_2F_4$, $OC_3F_6$ and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$ and $OC_4F_8$ include, but not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula (f3), g is preferably an integer of 3 or more, more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably —$(OC_2F_4$—$OC_3F_6)_g$— or —$(OC_2F_4$—$OC_4F_8)_g$—.

In the formula (f4), e is preferably an integer of 1 or more and 100 or less, and more preferably 5 or more and 100 or less. The sum of a, b, c, d, e, and f is preferably 5 or more, more preferably 10 or more, for example 10 or more and 100 or less.

In the formula (f5), f is preferably an integer of 1 or more and 100 or less, more preferably 5 or more and 100 or less. The sum of a, b, c, d, e, and f is preferably 5 or more, more preferably 10 or more, for example 10 or more and 100 or less.

In one embodiment, $R^F$ is a group of the formula (f1).
In one embodiment, $R^F$ is a group of the formula (f2).
In one embodiment, $R^F$ is a group of the formula (f3).
In one embodiment, $R^F$ is a group of the formula (f4).
In one embodiment, $R^F$ is a group of the formula (f5).

In $R^F$, the ratio of e to f (hereinafter, referred to as "e/f ratio") is 0.1 to 10, preferably 0.2 to 5, more preferably 0.2 to 2, still more preferably 0.2 to 1.5, and further preferably 0.2 to 0.85. An e/f ratio of 10 or less further enhances the lubricity, friction durability and chemical resistance (for example, durability to artificial sweat) of the surface-treating layer obtained from this compound. A lower e/f ratio further enhances the lubricity and friction durability of the surface-treating layer. On the other hand, an e/f ratio of 0.1 or more can further enhance stability of the compound. A higher e/f ratio further enhances stability of the compound.

In one embodiment, the e/f ratio is preferably 0.2 to 0.95, and more preferably 0.2 to 0.9.

In one embodiment, from the viewpoint of heat resistance, the e/f ratio is preferably 1.0 or more, and more preferably 1.0 to 2.0.

The number average molecular weight of $R^{F1}$ in the fluoropolyether group-containing compound is not limited, but is, for example, 500 to 30,000, preferably 1,500 to 30,000, and more preferably 2,000 to 10,000. As used herein, the number average molecular weight of $R^{F1}$ and $R^{F2}$ are values measured by $^{19}$F-NMR.

In another embodiment, the number average molecular weight of $R^{F1}$ may be 500 to 30,000, preferably 1,000 to 20,000, more preferably 2,000 to 15,000, and further preferably 2,000 to 10,000, for example, 3,000 to 6,000.

In another embodiment, the number average molecular weight of $R^{F1}$ may be 4,000 to 30,000, preferably 5,000 to 10,000, and more preferably 6,000 to 10,000.

In the formulas (1) and (2), $X^a$ is each independently at each occurrence a single bond or a divalent organic group.

$X^a$ is a single bond or a divalent linking group directly bonded to the ring of the formulas (1) and (2). $X^a$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

$X^a$ is still more preferably a group of the following formula:

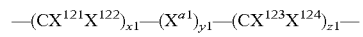

wherein $X^{121}$ to $X^{124}$ are each independently H, F, OH, or —$OSi(OR^{121})_3$, wherein three $R^{121}$ are each independently an alkyl group having 1 to 4 carbon atoms;
$X^{a1}$ is —C(=O)NH—, —NHC(=O)—, —O—, —C(=O)O—, —OC(=O)—, —OC(=O)O—, or —NHC(=O)NH—, wherein the left side of each bond is bonded to $CX^{121}X^{122}$; and
x1 is an integer of 0 to 10, y1 is 0 or 1, and z1 is an integer of 1 to 10.

$X^{a1}$ is preferably —O— or —C(=O)O—.

$X^a$ is particularly preferably a group of the following formula:

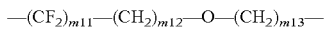

wherein m11 is an integer of 1 to 3, m12 is an integer of 1 to 3, and m13 is an integer of 1 to 3;

a group of the formula:

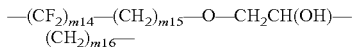

wherein m14 is an integer of 1 to 3, m15 is an integer of 1 to 3, and m16 is an integer of 1 to 3;

a group of the formula:

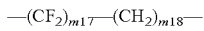

wherein m17 is an integer of 1 to 3 and m18 is an integer of 1 to 3;

a group of the formula:

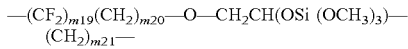

wherein m19 is an integer of 1 to 3, m20 is an integer of 1 to 3, and m21 is an integer of 1 to 3; or a group of the formula:

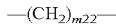

wherein m22 is an integer of 1 to 3.

Specific examples of $X^a$ include, but not limited to: —$CH_2$—, —$C_2H_4$—, —$C_3H_6$—, —$C_4H_8$—, —$C_4H_8$—O—$CH_2$—, —CO—O—$CH_2$—CH(OH)—$CH_2$—, —$(CF_2)_{n5}$— (n5 is an integer of 0 to 4), —$(CF_2)_{n5}$—$(CH_2)_{m5}$— (n5 and m5 are each independently an integer of 0 to 4), —$CF_2CF_2CH_2OCH_2CH(OH)CH_2$—, and —$CF_2CF_2CH_2OCH_2CH(OSi(OCH_3)_3)CH_2$—.

In the formulas (1) and (2), $R^{A1}$ is each independently at each occurrence an $OR^{Ac}$ group-containing group.

$R^{Ac}$ is a (meth)acryloyl group. Here, as used herein, the "(meth)acryloyl group" includes an acryloyl group and a methacryloyl group.

When the compound of the present disclosure contains a (meth)acryloyl group, the solubility in a solvent can be improved, and the friction durability of the surface-treating layer obtained from such a compound can be further improved.

In one embodiment, $R^{AC}$ is an acryloyl group.

In another embodiment, $R^{AC}$ is a methacryloyl group.

In a preferable embodiment, $R^{A1}$ is —$R^{A1}$—$R^{A4}$—$OR^{AC}$ or —$R^{A6}$—$R^{A5}$—$(OR^{AC})_2$.

In one embodiment, $R^{A1}$ is —$R^{A4}$—$OR^{AC}$ or —$R^{A5}$—$(OR^{AC})_2$.

In one embodiment, $R^{A1}$ is —$R^{A4}$—$OR^{AC}$ or —$R^{A6}R^{A4}OR^{AC}$. When $R^{A1}$ is —$R^{A4}$—$OR^{AC}$ or —$R^{A6}$—$R^{A4}$—$OR^{AC}$, the initial contact angle of the surface-treating layer obtained from the compound of the present disclosure can be increased.

In another embodiment, $R^{A1}$ is —$R^{A5}$—$(OR^{AC})_2$ or —$R^{A6}$—$R^{A5}$—$(OR^{AC})_2$. When $R^{A1}$ is —$R^{A5}$—$(OR^{AC})_2$, the solubility of the compound of the present disclosure in a solvent can be further improved, and the durability of the surface-treating layer obtained from the compound of the present disclosure can be further increased.

$R^{A4}$ is a $C_{1-10}$ alkylene group, preferably a $C_{2-6}$ alkylene group, and more preferably a $C_{2-4}$ alkylene group.

$R^{A5}$ is a trivalent hydrocarbon group having 1 to 10 carbon atoms, preferably a trivalent hydrocarbon group having 4 to 6 carbon atoms.

In a preferable embodiment, $R^{A5}$ is the following group:

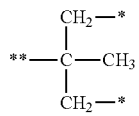

wherein is bonded to $OR^{AC}$ and ** is bonded to $X^b$.

$R^{A6}$ is a single bond or —$C_{1-10}$ alkylene-O—.

In one embodiment, $R^{A6}$ is a single bond.

In another embodiment, $R^{A6}$ is —$C_{1-10}$ alkylene-O—.

-$C_{1-10}$ alkylene-O— may preferably be -$C_{1-6}$ alkylene-O—, more preferably -$C_{2-6}$ alkylene-O—, and still more preferably -$C_{2-4}$ alkylene-O—.

In the formulas (1) and (2), $X^b$ is a divalent organic group containing at least two heteroatoms.

By containing at least two heteroatoms in $X^b$, the compound of the present disclosure can further improve the solubility in a solvent, and further improve the friction durability of the surface-treating layer obtained from such a compound.

In a preferable embodiment, $X^b$ is —$X_c$—$X_d$—.

$X^c$ is a divalent organic group containing a heteroatom.

In a preferable embodiment, $X^c$ is a group of the following formula:

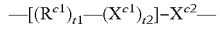

wherein $R^{c1}$ is each independently at each occurrence a single bond or a $C_{1-12}$ alkylene group;

$X^{c1}$ is each independently at each occurrence O, $NR^{x1}$, S, SO, or $SO_2$;

$R^{x1}$ is each independently at each occurrence a hydrogen atom or a $C_{1-6}$ alkyl group;

$X^{c2}$ is O or $NR^{x2}$;

$R^{x2}$ is each independently at each occurrence a hydrogen atom or a $C_{1-6}$ alkyl group;

t1 is an integer of 1 to 6; and t2 is an integer of 1 to 6, wherein in $[(R^{c1})_{t1}—(X^{c1})_{t2}]$, the occurrence order of $R^{c1}$ and $X^{c1}$ is not limited in the formula.

By having any of the above-described groups as Xc, the compound of the present disclosure can further improve the friction durability of the surface-treating layer obtained from such a compound.

In one embodiment, $R^{c1}$ is each independently at each occurrence or a $C_{1-12}$ alkylene group.

In $R^{c1}$, the $C_{1-12}$ alkylene group is preferably a $C_{1-10}$ alkylene group, more preferably a $C_{2-10}$ alkylene group, for example, a $C_{2-9}$ alkylene group.

$X^{c1}$ is preferably, each independently at each occurrence, —S—, —SO—, or —$SO_2$—, and more preferably —S—.

$X^{c2}$ is preferably O.

t1 is an integer of 1 to 6, preferably an integer of 2 to 4, more preferably 2 to 3, and still more preferably 2.

t2 is an integer of 1 to 6, preferably an integer of 1 to 3, more preferably an integer of 1 to 2, and still more preferably 1.

In a preferable embodiment, t1 is 2 and t2 is 1.

In a preferable embodiment, $X^c$ is —$R^{c1'}$—$X^{c1}$—$R^{c1''}$—$X^{c2}$—;

$R^{c1'}$ is a $C_{1-6}$ alkylene group;

$R^{c1''}$ is a $C_{1-12}$ alkylene group;

$X^{c1''}$ is O, $NR^{x1}$, S, SO, or $SO_2$;

$R^{x1}$ is each independently at each occurrence a hydrogen atom or a $C_{1-6}$ alkyl group;

$X^{c2}$ is O or $NR^{x2}$; and $R^{x2}$ is each independently at each occurrence a hydrogen atom or a $C_{1-6}$ alkyl group.

In a more preferable embodiment,
$X^c$ is $-R^{c1'}-X^{c1}-R^{c1''}-X^{c2}-$;
$R^{c1'}$ is a $C_{1-6}$ alkylene group;
$R^{c1''}$ is a $C_{1-12}$ alkylene group;
$x^{c1}$ is S, SO, or $SO_2$; and
$X^{c2}$ is O.

In a still more preferable embodiment,
$X^c$ is $-R^{c1'}-X^{c1}-R^{c1''}-X^{c2}-$;
$R^{c1'}$ is a $C_{2-4}$ alkylene group;
$R^{c1''}$ is a $C_{2-12}$ alkylene group;
$x^{c1}$ is S; and
$X^{c2}$ is O.

$X^d$ is $-CO-NR^{d2}-$, $-OCO-NR^{d2}-$, $-NR^{d2}-CO-$, or $-NR^{d2}-COO-$.

$R^{d2}$ is a hydrogen atom or a $C_{1-6}$ alkyl group.

In a preferable embodiment, $X^d$ is $-CO-NR^{d2}-$.

In the formula (1) and (2), $R^B$ is each independently at each occurrence $R^{F1}-X^a-$ or $R^{A1}-X^b-$. Here, when $R^B$ is $R^{F1}-X^a-$, there may be two $R^{F1}-X^a-$ in the formula (1), and these may be the same or may be different. Similarly, when $R^B$ is $R^{A1}-X^b-$, there may be a plurality of $R^{A1}-X^b-$ in the formulas (1) and (2), and these may be the same or may be different.

In one embodiment, $R^B$ is $R^{F1}-X^a$. When $R^B$ is $R^{F1}-X^a-$, the initial contact angle of the surface-treating layer obtained from the compound of the present disclosure can be increased.

In a preferable embodiment, $R^B$ is $R^{A1}-X^b-$. When $R^B$ is $R^{A1}-X^b-$, the solubility of the compound of the present disclosure in a solvent can be further improved, and the durability of the surface-treating layer obtained from the compound of the present disclosure can be further increased.

The number average molecular weight of the fluorine-containing isocyanul compound of the formulas (1) and (2) is not limited, and is, for example, 1,000 to 30,000, preferably 2,000 to 20,000, more preferably 2,500 to 6,000, and still more preferably 2,500 to 5,000. As used herein, the number average molecular weight of the fluorine-containing isocyanul compound is a value measured by $^{19}F$-NMR. When the number average molecular weight of the fluorine-containing isocyanul compound is within the above range, the solubility of the fluorine-containing isocyanul compound in a solvent is improved. Further, the initial contact angle and friction durability of the surface-treating layer obtained from the compound can be improved.

In one embodiment, the compound of the present disclosure is a compound of the formula (1).

In another embodiment, the compound of the present disclosure is a compound of the formula (2).

In another embodiment, the compound of the present disclosure is a compound of the formula (1) and a compound of the formula (2). That is, the compound is used as a mixture of the compound of the formula (1) and the compound of the formula (2).

In the mixture, the amount of the compound of the formula (2) is preferably 0.1 mol % or more and 35 mol % or less with respect to the total amount of the compound of the formula (1) and the compound of the formula (2). The lower limit of the content of the compound of the formula (2) with respect to the total amount of the compound of the formula (1) and the compound of the formula (2) may be preferably 0.1 mol %, more preferably 0.2 mol %, still more preferably 0.5 mol %, further preferably 1 mol %, particularly preferably 2 mol %, and especially 5 mol %. The upper limit of the content of the compound of the formula (2) with respect to the total amount of the compound of the formula (1) and the compound of the formula (2) may be preferably 35 mol %, more preferably 30 mol %, still more preferably 20 mol %, further preferably 15 mol % or 10 mol %. The amount of the compound of formula (2) with respect to the total amount of the compound of formula (1) and the compound of formula (2) is preferably 0.1 mol % or more and 30 mol % or less, more preferably 0.1 mol % or more and 20 mol % or less, still more preferably 0.2 mol % or more and 10 mol % or less, further preferably 0.5 mol % or more and 10 mol % or less, particularly preferably 1 mol % or more and 10 mol % or less, for example, 2 mol % or more and 10 mol % or less or 5 mol % or more and 10 mol % or less. When the compound of the formula (2) is within such a range, the friction durability can be further improved.

The fluorine-containing isocyanul compound of the present disclosure can be synthesized, for example, as follows.

A compound of the following formula (1a):

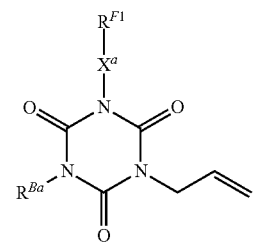

(1a)

wherein:
$R^{F1}$ is $Rf^1-R^F-O_q-$;
$Rf^1$ is a $C_{1-16}$ alkyl group optionally substituted with one or more fluorine atoms;
$R^F$ is a divalent fluoropolyether group;
q is 0 or 1;
$X^a$ is a single bond or divalent organic group; and
$R^{Ba}$ is $R^{F1}-X^a-$ or an allyl group,
is reacted with a compound of the following formula (2a):

HX$^{c1}$—R$^{b2}$—OH (2a)

wherein:
$X^{c1}$ is each independently at each occurrence O, $NR^{x1}$, S, SO, or $SO_2$;
$R^{x1}$ is each independently at each occurrence a hydrogen atom or a $C_{1-6}$ alkyl group; and
$R^{b2}$ is a $C_{1-10}$ alkylene group
to obtain a compound of the following formula (1b):

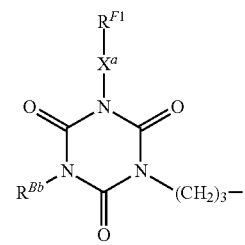

(1b)

wherein:
$R^{F1}$, $R^{f1}$, $R^F$, q, $X^a$, $X^{c1}$, and $R^{b2}$ have the same meaning as above; and
$R^{Bb}$ is $R^{F1}-X^a-$ or $-(CH_2)_3-X^{c1}-R^{b2}-OH$.

Furthermore, the compound of the formula (1b) obtained above is reacted to the compound of the following formula (2b):

$$OCN-R^{41} \quad (2b)$$

whereby the fluorine-containing isocyanul compound of the formula (1) of the present disclosure can be obtained.

The compound of the present disclosure can be used in a variety of applications. Next, examples of applications of the compound of the present disclosure will be described.

The compound of the present disclosure can be used with polymerizable coating agent monomers. A composition comprising the compound of the present disclosure and a polymerizable coating agent monomer is also one aspect of the present inventions (sometimes referred to herein as composition (a)). The composition (a), which has the above configuration, can provide a coating film which has a large static contact angle with respect to water or n-hexadecane, is transparent, has excellent releasability, is less likely to suffer deposition of fingerprints, and allows fingerprints deposited thereon to be completely wiped.

The polymerizable coating agent monomer is preferably a monomer containing a carbon-carbon double bond.

The polymerizable coating agent monomer means a composition containing a compound that may be, but is not limited to, any of monofunctional and/or polyfunctional acrylates or methacrylates (hereinafter, acrylates and methacrylates are collectively referred to as "(meth)acrylates"), monofunctional and/or polyfunctional urethane (meth)acrylates, and monofunctional and/or polyfunctional epoxy (meth)acrylates. The composition to constitute the matrix may be, but is not limited to, a composition that is usually to serve as a hard coating agent or an anti-reflective agent, and examples thereof include hard coating agents containing a polyfunctional (meth)acrylate and anti-reflective agents containing a fluorine-containing (meth)acrylate. Examples of commercially available products of the hard coating agent include Beamset 502H, 504H, 505A-6, 550B, 575CB, 577, and 1402 (trade name, Arakawa Chemical Industries, Ltd.), Ebecryl 40 (trade name, Daicel Cytec Co., Ltd.), and HR300 series (trade name, The Yokohama Rubber Co., Ltd.). An example of commercially available products of the anti-reflective agent is Optool AR-110 (trade name, Daikin Industries, Ltd.).

The composition (a) may further contain any of additives such as antioxidants, thickening agents, leveling agents, antifoaming agents, antistatic agents, antifogging agents, ultraviolet absorbers, pigments, dyes, inorganic fine particles such as silica, fillers such as aluminum paste, talc, glass frit, and metal powder, and polymerization inhibitors such as butylated hydroxytoluene (BHT) and phenothiazine (PTZ).

The composition (a) may further contain a catalyst for urethanization, for example, a tin catalyst, a titanium catalyst, a zirconia catalyst, a bismuth catalyst, or an organic amin catalyst.

Examples of the tin catalyst include di-n-butyltin (IV) dilaurate.

Examples of the titanium catalyst include titanium diisopropoxy bis(ethylacetacetate), titanium tetra-n-butoxide, titanium tetra-2-ethylhexoxide, and titanium tetraacetylacetonate.

Examples of the zirconia catalyst include zirconium tetraacetylacetonate, zirconium tetra-n-butoxide, and zirconium dibutoxy bis(ethylacetoacetate).

Examples of the bismuth catalyst include bismuth tris(2-ethylhexanoate).

Examples of the organic amine catalyst include diazabicycloundecene.

The composition (a) preferably further contains a solvent. Examples of the solvent include a fluorine-containing organic solvent and a fluorine-free organic solvent.

Examples of the fluorine-containing organic solvent include perfluorohexane, perfluorooctane, perfluorodimethylcyclohexane, perfluorodecalin, perfluoroalkyl ethanol, perfluorobenzene, perfluorotoluene, perfluoroalkyl amine (for example, Florinert (trade name)), perfluoroalkyl ether, perfluorobutyl tetrahydrofuran, polyfluoroaliphatic hydrocarbon (Asahiklin $AC_{6000}$ (trade name)), hydrochlorofluorocarbon (for example, Asahiklin AK-225 (trade name)), hydrofluoroether (for example, Novec (trade name), HFE-7100 (trade name), HFE-7300 (trade name)), 1,1,2,2,3,3,4-heptafluorocyclopentane, fluorine-containing alcohol, perfluoroalkyl bromide, perfluoroalkyl iodide, perfluoropolyether (for example, Krytox (trade name), Demnum (trade name), Fomblin (trade name)), 1,3-bistrifluoromethylbenzene, 2-(perfluoroalkyl)ethyl methacrylate, 2-(perfluoroalkyl)ethyl acrylate, perfluoroalkylethylene, Freon 134a, and hexafluoropropene oligomers.

Examples of the fluorine-free organic solvent include acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethyl formamide, dimethyl sulfoxide, 2-butanone, acetonitrile, benzonitrile, butanol, 1-propanol, 2-propanol, ethanol, methanol, and diacetone alcohol.

Among them, the solvent is preferably methyl isobutyl ketone, propylene glycol monomethyl ether, hexadecane, butyl acetate, acetone, 2-butanone, cyclohexanone, ethyl acetate, diacetone alcohol, or 2-propanol.

As the solvent, these may be used singly or in combinations of two or more thereof.

The solvent is preferably used in the composition (a) in the range of 30 to 95% by mass, and more preferably 50 to 90% by mass.

For example, the composition (a) can form an antifouling layer when applied to a substrate. Further, the antifouling layer may also be formed by polymerizing the composition applied. Examples of the substrate include resins (particularly non-fluororesins).

The compound of the present disclosure can be used with a curable resin or a curable monomer. A composition containing the above-described compound and a curable resin or curable monomer is also one aspect of the present invention (sometimes referred to herein as composition (b)). The composition (b), which has the above configuration, can provide a coating film which is less likely to suffer deposition of fingerprints thereon and which allows fingerprints deposited thereon to be completely wiped off.

The curable resin may be either a photocurable resin or a thermosetting resin, and may be any resin having heat resistance and strength. A photo-curable resin is preferred, and an ultraviolet curable resin is more preferred.

Examples of the curable resin include acrylic polymers, polycarbonate polymers, polyester polymers, polyamide polymers, polyimide polymers, polyethersulfone polymers, cyclic polyolefin polymers, fluorine-containing polyolefin polymers (for example, PTFE), and fluorine-containing cyclic amorphous polymers (for example, Cytop (R), Teflon (R) AF).

Specific examples of the curable resin or monomers constituting the curable resin include alkyl vinyl ethers such as cyclohexyl methyl vinyl ether, isobutyl vinyl ether, cyclohexyl vinyl ether, and ethyl vinyl ether, glycidyl vinyl ether, vinyl acetate, vinyl pivalate, (meth)acrylates such as phenoxyethyl acrylate, benzyl acrylate, stearyl acrylate, lauryl acrylate, 2-ethylhexyl acrylate, allyl acrylate, 1,3-butanediol diacrylate, 1,4-butanediol diacrylate, 1,6-hexanediol diacrylate, trimethylol, propane triacrylate, pentaerythritol triacrylate, dipentaerythritol hexaacrylate, ethoxyethyl acrylate, methoxyethyl acrylate, glycidyl acrylate, tetrahydrofurfuryl acrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinylpyrrolidone, and dimethylaminoethyl methacrylate, silicone-based acrylates, maleic anhydride, vinylene carbonate, linear side chain polyacrylates, cyclic side chain polyacrylates, polynorbornene, polynorbornadiene, polycarbonate, polysulfonamide, and fluorine-containing cyclic amorphous polymers (for example, Cytop (R), Teflon (R) AF).

The curable monomer may be either a photocurable monomer or a thermosetting monomer, and is preferably an ultraviolet curable monomer.

Examples of the curable monomer include (a) urethane (meth)acrylates, (b) epoxy (meth)acrylates, (c) polyester (meth)acrylates, (d) polyether (meth)acrylates, (e) silicon (meth)acrylates, and (f) (meth)acrylate monomers.

Specific examples of the curable monomer include the following.

(a) Examples of the urethane (meth)acrylates include poly((meth)acryloyloxyalkyl)isocyanurates typified by tris(2-hydroxyethyl)isocyanurate diacrylate and tris(2-hydroxyethyl)isocyanurate triacrylate.

(b) The epoxy (meth)acrylates are those obtained by adding a (meth)acryloyl group to an epoxy group, and are typically those obtained from bisphenol A, bisphenol F, phenol novolac, or an alicyclic compound serving as a starting material.

(c) For the polyester (meth)acrylates, the polyester moiety thereof may be constituted by any of polyhydric alcohols such as ethylene glycol, 1,4-butanediol, 1,6-hexanediol, diethylene glycol, trimethylolpropane, dipropylene glycol, polyethylene glycol, polypropylene glycol, pentaerythritol, and dipentaerythritol, and any of polybasic acids such as phthalic acid, adipic acid, maleic acid, trimellitic acid, itaconic acid, succinic acid, terephthalic acid, and alkenylsuccinic acid.

(d) Examples of the polyether (meth)acrylates include polyethylene glycol di(meth)acrylate, polypropylene glycol di(meth)acrylate, and polyethylene glycol-polypropylene glycol di(meth)acrylate.

(e) The silicon (meth)acrylates are those obtained by modifying one or both of the ends of dimethyl polysiloxane having a molecular weight of 1,000 to 10,000 with a (meth)acryloyl group, and examples thereof include the following compounds.

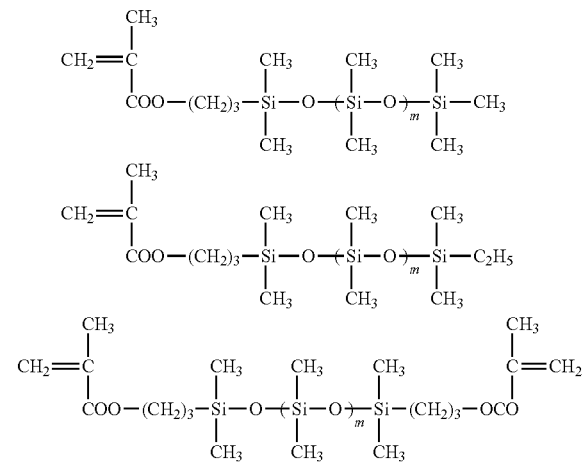

(f) Examples of the (meth)acrylate monomers include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, n-pentyl (meth) acrylate, 3-methylbutyl (meth)acrylate, n-hexyl (meth) acrylate, 2-ethyl-n-hexyl (meth)acrylate, n-octyl (meth)acrylate, cyclohexyl (meth)acrylate, isobornyl (meth)acrylate, benzyl (meth)acrylate, 2-hydroxyethyl (meth)acrylate, 2-hydroxypropyl (meth)acrylate, 3-hydroxypropyl (meth)acrylate, 4-hydroxybutyl (meth) acrylate, 5-hydroxypentyl (meth)acrylate, 6-hydroxyhexyl (meth)acrylate, 4-hydroxycyclohexyl (meth) acrylate, neopentyl glycol mono(meth)acrylate, 3-chloro-2-hydroxypropyl (meth)acrylate, (1,1-dimethyl-3-oxobutyl) (meth)acrylate, 2-acetoacetoxyethyl (meth)acrylate, 2-methoxyethyl (meth)acrylate, 2-ethoxyethyl (meth)acrylate, neopentyl glycol mono (meth)acrylate, 3-chloro-2-hydroxypropyl (meth)acrylate, glycerol mono(meth)acrylate, ethylene glycol diacrylate, propylene glycol diacrylate, 1,6-hexanediol diacrylate, 1,9-nonanediol diacrylate, 1,10-decanediol diacrylate, trimethylol propane triacrylate, and pentaerythritol tetraacrylate.

Preferred commercially available products of the curable resin and the curable monomer are as follows.

Examples of the curable resin include: silicon resins such as PAK-01 and PAK-02 (Toyo Gosei Co., Ltd.); nanoimprint resins such as NIF series (Asahi Glass Co., Ltd.); nanoimprint resins such as OCNL series (Tokyo Ohka Kogyo Co., Ltd.) and NIAC 2310 (Daicel Chemical Industries, Co., Ltd.); epoxy acrylate resins such as EH-1001, ES-4004, EX-$C_{101}$, EX-$C_{106}$, EX-$C_{300}$, EX-0501, EX-0202, EX-0205, and EX-5000 (Kyoeisha Chemical Co., Ltd.); and hexamethylene diisocyanate-based polyisocyanates such as Sumidur N-75, Sumidur N3200, Sumidur HT, Sumidur N3300, and Sumidur N3500 (Sumitomo Bayer Urethane Co., Ltd.).

Examples of the curable monomer include silicon acrylate resins, polyfunctional acrylates, polyfunctional methacrylates, and alkoxysilane group-containing (meth)acrylates.

Examples of the silicone acrylate resins among the curable monomers include: Silaplane FM-0611, Silaplane FM-0621, and Silaplane FM-0625; bi-terminal-type (meth) acrylate resins such as Silaplane FM-7711, Silaplane FM-7721, and Silaplane FM-7725; Silaplane FM-0411, Silaplane FM-0421, Silaplane FM-0428, Silaplane FM-DA11, Silaplane FM-DA21, and Silaplane DA25;

mono-terminal-type (meth)acrylate resins such as Silaplane FM-0711, Silaplane FM-0721, Silaplane FM-0725, Silaplane TM-0701, and Silaplane TM-0701T (JCN Co., Ltd.).

Examples of the polyfunctional acrylates include A-9300, A-9300-1CL, A-GLY-9E, A-GLY-20E, A-TMM-3, A-TMM-3L, A-TMM-3LM-N, A-TMPT, and A-TMMT (Shin-Nakamura Chemical Co., Ltd.).

An example of the polyfunctional methacrylates is TMPT (Shin-Nakamura Chemical Co., Ltd.).

Examples of the alkoxysilane group-containing (meth) acrylates include 3-(meth)acryloyloxypropyltrichlorosilane, 3-(meth)acryloyloxypropyltrimethoxysilane, 3-(meth)acryloyloxypropyltriethoxysilane, 3-(meth)acryloyloxypropyltriisopropoxysilane, (also referred to as (triisopropoxysilyl) propyl methacrylate (abbreviation: TISMA) and (triisopropoxysilyl)propyl acrylate), 3-(meth)acryloxyisobutyltrichlorosilane, 3-(meth)acryloxyisobutyltriethoxysilane, 3-(meth)acryloxyisobutyltriisopropoxysilane, and 3-(meth)acryloxyisobutyltrimethoxysilane.

The composition (b) preferably further contains a crosslinking catalyst. Examples of the crosslinking catalyst include a radical polymerization initiator and an acid generator.

The radical polymerization initiator is a compound that generates a radical by heat or light, and examples thereof include a radical thermopolymerization initiator and a radical photopolymerization initiator. In the present invention, the radical photopolymerization initiator is preferred.

Examples of the radical thermopolymerization initiator include: peroxide compounds, including diacyl peroxides such as benzoyl peroxide and lauroyl peroxide, dialkyl peroxides such as dicumyl peroxide and di-t-butyl peroxide, peroxy carbonates such as diisopropyl peroxydicarbonate and bis(4-t-butylcyclohexyl)peroxydicarbonate, and alkyl peresters such as t-butyl peroxyoctoate and t-butyl peroxybenzoate; and radical-generating azo compounds such as azobisisisobutyronitrile.

Examples of the radical photopolymerization initiator include: -diketones such as benzyl and diacetyl; acyloins such as benzoin; acyloin ethers such as benzoin methyl ether, benzoin ethyl ether, and benzoin isopropyl ether; thioxanthones such as thioxanthone, 2,4-diethyl thioxanthone, and thioxanthone-4-sulfonic acid;

benzophenones such as benzophenone, 4,4'-bis(dimethylamino)benzophenone, and 4,4'-bis(diethylamino)benzophenone; acetophenones such as acetophenone, 2-(4-toluenesulfonyloxy)-2-phenylacetophenone, p-dimethylaminoacetophenone, 2,2'-dimethoxy-2-phenylacetophenone, p-methoxyacetophenone, 2-methyl[4-(methylthio)phenyl]-2-morpholino-1-propanone, and 2-benzyl-2-dimethylamino-1-(4-morpholinophenyl)-butan-1-one;
quinones such as anthraquinone and 1,4-naphthoquinone; aminobenzoic acids such as ethyl 2-dimethylaminobenzoate, ethyl 4-dimethylaminobenzoate, (n-butoxy)ethyl 4-dimethylaminobenzoate, isoamyl 4-dimethylaminobenzoate, and 2-ethylhexyl 4-dimethylaminobenzoate; halogen compounds such as phenacyl chloride and trihalomethyl phenyl sulfone; acyl phosphine oxides; and peroxides such as di-t-butyl peroxide.

Examples of commercially available products of the radical photopolymerization initiator include the following:
IRGACURE 651: 2,2-dimethoxy-1,2-diphenylethan-1-one,
IRGACURE 184: 1-hydroxy-cyclohexyl-phenyl-ketone,
IRGACURE 2959: 1-[4-(2-hydroxyethoxy)-phenyl]-2-hydroxy-2-methyl-1-propan-1-one,
IRGACURE 127: 2-hydroxy-1-{4-[4-(2-hydroxy-2-methyl-propionyl)-benzyl]-phenyl}-2-methyl-propan-1-one,
IRGACURE 907: 2-methyl-1-(4-methylthiophenyl)-2-morpholinopropan-1-one,
IRGACURE 369: 2-benzyl-2-dimethylamino-1-(4-morpholinophenyl)-butanone-1,
IRGACURE 379: 2-(dimethylamino)-2-[(4-methylphenyl)methyl]-1-[4-(4-morpholinyl)phenyl]-1-butanone,
IRGACURE 819: bis(2,4,6-trimethylbenzoyl)-phenylphosphine oxide,
IRGACURE 784: bis(η5-2,4-cyclopentadien-1-yl)-bis(2,6-difluoro-3-(1H-pyrrol-1-yl)-phenyl)titanium,
IRGACURE OXE 01: 1,2-octanedione, 1-[4-(phenylthio)-, 2-(O-benzoyloxime),
IRGACURE OXE 02: ethanone, 1-[9-ethyl-6-(2-methylbenzoyl)-9H-carbazol-3-yl]-, 1-(O-acetyloxime),
IRGACURE 261, IRGACURE 369, IRGACURE 500, Darocur 1173: 2-hydroxy-2-methyl-1-phenyl-propan-1-one,
Darocur TPO: 2,4,6-trimethylbenzoyl-diphenyl-phosphine oxide,
Darocur 1116, Darocur 2959, Darocur 1664, Darocur 4043,
IRGACURE 754 oxy-phenylacetic acid: Mixture of oxyphenylacetic acid 2-[2-oxo-2-phenylacetoxyethoxy] ethyl ester and 2-(2-hydroxyethoxy)ethyl ester,
IRGACURE 500: Mixture of IRGACURE 184 and benzophenone (1:1),
IRGACURE 1300: Mixture of IRGACURE 369 and IRGACURE 651 (3:7),
IRGACURE 1800: Mixture of CGI403 and IRGACURE 184 (1:3),
IRGACURE 1870: Mixture of CGI403 and IRGACURE 184 (7:3), and
Darocur 4265: Mixture of Darocur TPO and Darocur 1173 (1:1).

IRGACUREs are produced by BASF SE and Darocurs are produced by Merck Japan.

When a radical photopolymerization initiator is used as the crosslinking catalyst, a sensitizer such as diethylthioxanthone or isopropylthioxanthone may be used in combination and a polymerization accelerator such as Darocur EDB (ethyl-4-dimethylaminobenzoate) and Darocur EHA (2-ethylhexyl-4-dimethylaminobenzoate) may also be used in combination.

The amount of the sensitizer when used is preferably 0.1 to 5 parts by mass with respect to 100 parts by mass of the curable resin or the curable monomer. The amount thereof is more preferably 0.1 to 2 parts by mass.

The amount of the polymerization accelerator when used is preferably 0.1 to 5 parts by mass with respect to 100 parts by mass of the curable resin or the curable monomer. The amount thereof is more preferably 0.1 to 2 parts by mass.

The acid generator is a material capable of generating an acid by application of heat or light, and examples thereof include a thermoacid generator and a photoacid generator. In the present invention, a photoacid generator is preferred.

Examples of the thermoacid generator include benzoin tosylate, nitrobenzyl tosylate (particularly 4-nitrobenzyl tosylate), and alkyl esters of other organic sulfonic acids.

The photoacid generator is composed of a chromophore that absorbs light and an acid precursor that is to be converted into an acid after decomposition. Application of light of a specific wavelength excites a photoacid generator having such a structure, generating an acid from the acid precursor moiety.

Examples of the photoacid generator include: salts such as diazonium salt, phosphonium salt, sulfonium salt, iodonium salt, $CF_3SO_3$, p-$CH_3PhSO_3$, and p-$NO2PhSO_3$ wherein Ph is a phenyl group; organic halogen compounds; orthoquinone-diazidesulfonyl chlorides; and sulfonic acid esters. Examples of the photoacid generator also include 2-halomethyl-5-vinyl-1,3,4-oxadiazole compounds, 2-trihalomethyl-5-aryl-1,3,4-oxadiazole compounds, and 2-trihalomethyl-5-hydroxyphenyl-1,3,4-oxadiazole compounds.

The organohalogen compounds are compounds that generate a hydrohalic acid (for example, hydrogen chloride).

Examples of commercially available products of the photoacid generator include the following:

products of Wako Pure Chemical Industries, Ltd., such as WPAG-145 (bis(cyclohexylsulfonyl)diazomethane), WPAG-170 (bis(t-butylsulfonyl)diazomethane), WPAG-199 (bis(p-toluenesulfonyl)diazomethane), WPAG-281 (triphenylsulfonium trifluoromethanesulfonate), WPAG-336 (diphenyl-4-methylphenylsulfonium trifluoromethanesulfonate), and WPAG-367 (diphenyl-2,4,6-trimethylphenylsulfonium p-toluenesulfonate); products of Ciba Specialty Chemicals Inc., such as IRGACURE PAG103 ((5-propylsulfonyloxyimino-5H-thiophen-2-ylidene)-(2-methylphenyl)acetonitrile), IRGACURE PAG108 ((5-octylsulfonyloxyimino-5H-thiophen-2-ylidene)-(2-methylphenyl)acetonitrile)), IRGACURE PAG121 (5-p-toluenesulfonyloxyimino-5H-thiophen-2-ylidene-(2-methylphenyl)acetonitrile), IRGACURE PAG203, and CGI725; and products of Sanwa Chemical Co., such as TFE-triazine (2-[2-(furan-2-yl)ethenyl]-4,6-bis(trichloromethyl)-s-triazine), TME-triazine (2-[2-(5-methylfuran-2-yflethenyl]-4,6-bis(trichloromethyl)-s-triazine), MP-triazine (2-(methoxyphenyl)-4,6-bis(trichloromethyl)-s-triazine), and dimethoxy[2-[2-(3,4-dimethoxyphenyl)ethenyl]-4,6-bis(tri-chloromethyl)-s-triazine].

The amount of the crosslinking catalyst when used is preferably 0.1 to 10 parts by mass with respect to 100 parts by mass of the curable resin or the curable monomer. The crosslinking catalyst in an amount within this range can provide a sufficiently cured product. The amount of the crosslinking catalyst is more preferably 0.3 to 5 parts by mass, still more preferably 0.5 to 2 parts by mass.

Further, when an acid generator is used as the crosslinking catalyst, an acid scavenger may be added as appropriate to control diffusion of the acid generated from the acid generator.

The acid scavenger is preferably, but is not limited to, a basic compound such as amines (particularly, organic amines), basic ammonium salts, and basic sulfonium salts. Among these acid scavengers, organic amines are more preferable because of their excellent image performance.

Specific examples of the acid scavenger include 1,5-diazabicyclo[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, pyridinium p-toluenesulfonate, 2,4,6-trimethylpyridinium p-toluenesulfonate, tetramethylammonium p-toluenesulfonate, tetrabutylammonium lactate, triethylamine, and tributylamine. Preferred among these are organic amines such as 1,5-diazabicyclo[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, triethylamine, and tributylamine.

The amount of the acid scavenger is preferably 20 parts by mass or less, more preferably 0.1 to 10 parts by mass, still more preferably 0.5 to 5 parts by mass, with respect to 100 parts by mass of the acid generator.

The composition (b) may contain a solvent. Examples of the solvent include water-soluble organic solvents, organic solvents (especially, oil-soluble organic solvents) and water.

Examples of the water-soluble organic solvents include acetone, methyl ethyl ketone, methyl amyl ketone, ethyl acetate, propylene glycol, propylene glycol monomethyl ether, propylene glycol monomethyl ether acetate (PGMEA), dipropylene glycol, dipropylene glycol monomethyl ether, dipropylene glycol dimethyl ether, dipropylene glycol monomethyl ether acetate, dipropylene glycol diacetate, tripropylene glycol, 3-methoxybutyl acetate (MBA), 1,3-butylene glycol diacetate, cyclohexanol acetate, dimethyl formamide, dimethyl sulfoxide, methyl cellosolve, cellosolve acetate, butyl cellosolve, butyl carbitol, carbitol acetate, ethyl lactate, isopropyl alcohol, methanol, and ethanol.

Examples of the organic solvents include chloroform, $HFC_{141}b$, $HCHC_{225}$, hydrofluoroether, pentane, hexane, heptane, octane, cyclohexane, benzene, toluene, xylene, petroleum ether, tetrahydrofuran, 1,4-dioxane, methyl isobutyl ketone, butyl acetate, 1,1,2,2-tetrachloroethane, 1,1,1-trichloroethane, trichloroethylene, perchloroethylene, tetrachlorodifluoroethane, and trichlorotrifluoroethane. These solvents may be used singly or in combinations of two or more thereof.

From the viewpoint of the solubility of the components contained in a resist composition and safety, the solvent is particularly preferably PGMEA or MBA.

The solvent is preferably used in the composition (b) in the range of 10 to 95% by mass. The content thereof is more preferably 20 to 90% by mass.

For example, the composition (b) can form a resist film when applied to a substrate. Examples of a material of the substrate include synthetic resins.

Examples of the synthetic resins include cellulose resins such as triacetyl cellulose (TAC), polyolefins such as polyethylene, polypropylene, ethylene-propylene copolymers, and ethylene-vinyl acetate copolymers (EVA), cyclic polyolefins, modified polyolefins, polyvinyl chloride, polyvinylidene chloride, polystyrene, polyamide, polyimide, polyamide-imide, polycarbonate, poly-(4-methyl pentene-1), ionomers, acrylic resin, polymethyl methacrylate, acrylstyrene copolymers (AS resin), butadiene-styrene copolymers, ethylene-vinyl alcohol copolymers (EVOH), polyesters such as polyethylene terephthalate (PET), polybutylene terephthalate (PBT), and polycyclohexane terephthalate (PCT), polyether, polyether ketone (PEK), polyether ether ketone (PEEK), polyetherimide, polyacetal (POM), polyphenylene oxide, modified polyphenylene oxide, polyarylate, aromatic polyester (liquid crystal polymers), polytetrafluoroethylene, polyvinylidene fluoride, other fluororesins, styrene-, polyolefin-, polyvinyl chloride-, polyurethane-, fluororubber-, or chlorinated polyethylene-based thermoplastic elastomers, epoxy resin, phenol resin, urea resin, melamine resin, unsaturated polyester, silicone resin, and polyurethane, and copolymers, blends, and polymer alloys mainly formed from these polymers. One of these may be used or two or more of these may be used in combination (for example, in the form of a laminate of two or more layers).

The resist film can be used in nanoimprinting. For example, a resist cured product with a pattern transferred thereon may be produced by a production method including: pressing a mold with a fine pattern formed on the surface thereof to the resist film to transfer the fine pattern; curing the resist film with the transferred pattern formed thereon to provide a resist cured product with the transferred pattern; and releasing the resist cured product from the mold.

The compound of the present disclosure can be used with a solvent. A composition containing the above-described compound and a solvent is also one aspect of the present invention (sometimes referred to herein as composition (c)).

In the composition (c), the concentration of the compound is preferably 0.001 to 5.0% by mass, more preferably 0.005 to 1.0% by mass, and still more preferably 0.01 to 0.5% by mass.

The solvent is preferably a fluorosolvent. Examples of inert fluorosolvents include perfluorohexane, perfluoromethyl cyclohexane, perfluoro-1,3-dimethyl cyclohexane, and dichloropentafluoropropane (HCFC-225).

The composition (c) also preferably contains a fluorine-containing oil. The fluorine-containing oil is more preferably a compound of the following formula:

$$R^{111}-(R^{112}O)_m-R^{113}$$

wherein $R^{111}$ and $R^{113}$ are each independently F, an alkyl group having 1 to 16 carbon atoms, a fluorinated alkyl group having 1 to 16 carbon atoms, or $-R^{114}-X^{111}$ ($R^{114}$ is a single bond or am alkylene group having 1 to 16 carbon atoms; and $X^{111}$ is $-NH_2$, $-OH$, $-COON$, $-CH=CH_2$, $-OCH_2CH=CH_2$, a halogen, phosphoric acid, a phosphoric acid ester, a carboxylic acid ester, thiol, thioether, an alkyl ether (optionally substituted with fluorine), an aryl, an aryl ether, or an amide); $R^{112}$ is a fluorinated alkylene group having 1 to 4 carbon atoms; and m is an integer of 2 or more.

$R^{111}$ and $R^{113}$ are preferably each independently F, an alkyl group having 1 to 3 carbon atoms, a fluorinated alkyl group having 1 to 3 carbon atoms, or $-R^{114}-X^{111}$ (wherein $R^{114}$ and $X^{111}$ are defined in the same manner as mentioned above), more preferably F, a perfluorinated alkyl group having 1 to 3 carbon atoms, or $-R^{114}-X^{111}$ (wherein $R^{114}$ is a single bond or an alkylene group having 1 to 3 carbon atoms; and $X^{111}$ is $-OH$ or $-OCH_2CH=CH_2$).

m is preferably an integer of 300 or less, more preferably an integer of 100 or less.

$R^{112}$ is preferably a perfluorinated alkylene group having 1 to 4 carbon atoms. Examples of $-R^{112}O-$ include:

those of the formula:

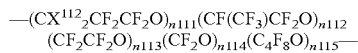

$$-(CX^{112}{}_2CF_2CF_2O)_{n111}(CF(CF_3)CF_2O)_{n112}$$
$$(CF_2CF_2O)_{n113}(CF_2O)_{n114}(C_4F_8O)_{n115}-$$

wherein n111, n112, n113, n114, and n115 are each independently an integer of 0 or 1 or more; $X^{112}$ is H, F, or Cl; and the occurrence order of the respective repeating units is not limited; and those of the formula:

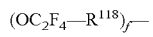

$$-(OC_2F_4-R^{118})_f-$$

wherein $R^{118}$ is a group selected from $OC_2F_4$, $OC_3F_6$, and $OC_4F_8$, and f is an integer of 2 to 100.

n111 to n115 are each preferably an integer of 0 to 200. n111 to n115 are preferably 1 or more, more preferably 5 to 300, further preferably 10 to 200, and particularly preferably 10 to 100 in total.

$R^{118}$ is a group selected from $OC_2F_4$, $OC_3F_6$, and $OC_4F_8$, or alternatively a combination of two or three groups independently selected from these groups. Examples of the combination of two or three groups independently selected from $OC_2F_4$, $OC_3F_6$ and $OC_4F_8$ include, but not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_2F_4-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. f is an integer of 2 to 100, and preferably an integer of 2 to 50. In the formula, $OC_2F_4$, $OC_3F_6$, and $OC_4F_8$ may be either linear or branched, and are preferably linear. In this embodiment, the formula: $-(OC_2F_4-R^{118})_f-$ is preferably the formula: $-(OC_2F_4-OC_3F_6)_f-$ or the formula: $-(OC_2F_4-OC_4F_8)_f-$.

The fluoropolyether preferably has a weight average molecular weight of 500 to 100,000, more preferably 50,000 or less, still more preferably 10,000 or less, and particularly preferably 6,000 or less. The weight average molecular weight can be determined by gel permeation chromatography (GPC).

Examples of commercially available products of the fluoropolyether include Demnum (Daikin Industries, Ltd.), Fomblin (Solvay Specialty Polymers Japan K.K.), Barrierta (NOK Kluber Co., Ltd.), and Krytox (DuPont).

The fluorine-containing oil may be contained in an amount of, for example, 50% by mass or less, preferably 30% by mass or less, with respect to any of the compounds of the formulas (1) and (2) of the present disclosure (in the case of two or more types, the total). In one embodiment, the fluorine-containing oil may be contained in an amount of, for example, 0.1% by mass or more, preferably 1% by mass or more, for example, 5% by mass or more, with respect to any of the compounds of the formulas (1) and (2) of the present disclosure (in the case of two or more types, the total).

The composition (c) can form a release layer on a substrate. The release layer may be formed by, for example, a method of immersing the substrate into the composition (c); a method of exposing the substrate to the vapor of the composition (c), thereby vapor-depositing the composition (c) on the substrate; a method of printing the composition (c) on the substrate; or a method of inkjet-applying the composition (c) to the substrate. The immersion, deposition, printing, or application may be followed by drying. The substrate may be a mold with an uneven pattern formed thereon, and the mold with a release layer formed thereon can be used in nanoimprinting.

Examples of the substrate include resins, for example, polymeric resins such as silicones.

The present disclosure also provides a soil resistant agent comprising the above-described compound or the above-described composition.

The soil resistant agent can be applied to resins (particularly non-fluororesins) for use.

The soil resistant agent can be used for a variety of articles (especially, optical materials) requiring surface antifouling property and swellability. Examples of the articles include front surface protective plates, antireflection plates, polarizing plates, and anti-glare plates for displays such as PDP and LCD; cover windows for foldable displays, rollable displays and bending displays; devices such as mobile phones and personal digital assistants; touchscreen sheets; optical discs such as DVDs, CD-Rs, and MOs; spectacle lenses; optical fibers; housing; and automobile interior articles (specifically, a seat and a back side thereof inside an automobile, an interior ceiling, a wall surface, and a floor, a dashboard and a lower portion thereof, a panel around a driver's seat, a switch, a lever, and the like inside a trunk).

Optical materials of articles such as optical discs preferably have a surface coated with a film formed from a compound containing a carbon-carbon double bond-containing composition or a polymer of a carbon-carbon double bond-containing composition in which the amount of perfluoropolyether (PFPE) is 0.01 to 10% by weight in the carbon-carbon double bond-containing composition or in the polymer of a carbon-carbon double bond-containing monomer. PFPE added in an amount of 0.01 to 10% by weight can provide characteristic physical properties (e.g., antifouling performance), a high surface hardness, and a high transmittance.

The present disclosure also relates to a mold release agent containing the compound of the present disclosure or the composition of the present disclosure.

From the mold release agent, a release layer can be formed on the substrate. The release layer may be formed by, for example, a method of immersing the substrate into the mold release agent; a method of exposing the substrate to the vapor of the release agent, thereby vapor-depositing the release agent on the substrate; a method of printing the composition on the substrate; or a method of inkjet-applying the composition to the substrate. The immersion, deposition, printing, or application may be followed by drying. The substrate may be a mold with an uneven pattern formed thereon, and the mold with a release layer formed thereon can be used in nanoimprinting.

Examples of the substrate include metals, metal oxides, quartz, polymeric resins such as silicones, semiconductors, insulators, and composites thereof.

The thickness of the surface-treating layer is not limited. In the case of an optical member, the thickness of the surface-treating layer is preferably in the range of 0.05 to 60 μm, preferably 0.1 to 30 μm, and more preferably 0.5 to 20 μm from the viewpoint of optical performance, surface lubricity, friction durability, and antifouling properties.

As described above, the compositions (a) to (c) of the present disclosure are used as a so-called surface-treating agent.

The articles obtained by using the surface-treating agent of the present disclosure have been described in detail above. The applications of the surface-treating agent of the present disclosure, the method of use thereof, the method of producing an article, and the like are not limited to those exemplified above.

The present disclosure includes the following embodiments.

[1] A compound of the following formula (1):

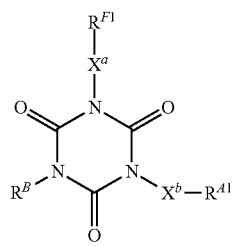

(1)

wherein:
$R^{F1}$ is $Rf^1$—RF—$O_q$—;
$Rf^1$ is a $C_{1-16}$ alkyl group optionally substituted with one or more fluorine atoms;
$R^F$ is a divalent fluoropolyether group;
q is 0 or 1;
$X^a$ is a single bond or divalent organic group;
$R^{A1}$ is an $OR^{Ac}$ group-containing group;
$R^{Ac}$ is a (meth)acryloyl group;
$X^b$ is a divalent organic group containing at least two heteroatoms; and
$R^B$ is $R^{F1}$—$X^a$— or $R^{A1}$—$X^b$—.

[2] The compound according to [1], wherein $R^F$ is each independently a group of the formula:

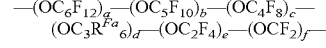

wherein $R^{Fa}$ is each independently at each occurrence a hydrogen atom, a fluorine atom, or a chlorine atom; and
a, b, c, d, e, and f are each independently an integer of 0 to 200, the sum of a, b, c, d, e, and f is 1 or more, and the occurrence order of the respective repeating units in parenthesis with a, b, c, d, e, or f, is not limited in the formula.

[3] The compound according to [2], wherein $R^{Fa}$ is a fluorine atom.

[4] The compound according to any one of [1] to [3], wherein $R^F$ is each independently a group of the following formula (f1), (f2), (f3), (f4), or (f5):

  (f1)

wherein d is an integer from 1 to 200,

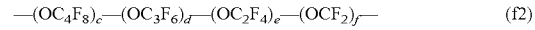  (f2)

wherein c and d are each independently an integer of 0 to 30;
e and f are each independently an integer of 1 to 200;
the sum of c, d, e, and f is an integer of 10 to 200; and
the occurrence order of the repeating units in parenthesis with the subscription c, d, e, or f is not limited in the formula,

  (f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or alternatively a combination of two or three groups selected from these groups; and
g is an integer of 2 to 100,

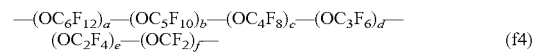  (f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units in parenthesis with a, b, c, d, e, or f, is not limited in the formula, and

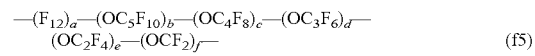  (f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units in parenthesis with a, b, c, d, e, or f, is not limited in the formula.

[5] The compound according to any one of [1] to [4], wherein $X^a$ is a group of the following formula:

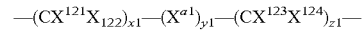

wherein $X^{121}$ to $X^{124}$ are each independently H, F, OH, or —OSi$(OR^{121})_{x1}$, wherein three $R^{121}$ are each independently an alkyl group having 1 to 4 carbon atoms;

$X^{a1}$ is —C(=O)NH—, —NHC(=O)—, —O—, —C(=O)O—, —OC(=O)—, —OC(=O)O—, or —NHC(=O)NH—, wherein the left side of each bond is bonded to $CX^{121}X^{122}$; and x1 is an integer of 0 to 10, y1 is 0 or 1, and z1 is an integer of 1 to 10.

[6] The compound according to any one of [1] to [5], wherein $X^a$ is a group of —$(CH_2)_{m22}$—, wherein m22 is an integer of 1 to 3.

[7] The compound according to any one of [1] to [6], wherein $R^{A1}$ is —$R^{A6}$—$R^{A4}$—$OR^{AC}$ or —$R^{A6}$—$R^{A5}$—$(OR^{AC})_2$;

$R^{A4}$ is a $C_{1-10}$ alkylene group;

$R^{A5}$ is a trivalent hydrocarbon group having 1 to 10 carbon atoms;

$R^{A6}$ is a single bond or -$C_{1-10}$ alkylene-O—; and $R^{AC}$ is a (meth)acryloyl group.

[8] The compound according to any one of [1] to [7], wherein $R^{A1}$ is —$R^{A4}$—$OR^{AC}$ or —$R^{A5}$— $(OR^{AC})_2$;

$R^{A4}$ is a $C_{1-10}$ alkylene group;

$R^{A5}$ is a trivalent hydrocarbon group having 1 to 10 carbon atoms; and $R^{AC}$ (meth)acryloyl group.

[9] The compound according to any one of [1] to [8], wherein $X^b$ is —$X^c$—$X^d$—;

$X^c$ is a divalent organic group containing a heteroatom;

$X^d$ is —CO—$NR^{d2}$—, —OCO—$NR^{d2}$—, —$NR^{d2}$—CO—, or —$NR^{d2}$—COO—; and $R^{d2}$ is a hydrogen atom or a $C_{1-6}$ alkyl group.

[10] The compound according to any one of [1] to [9], wherein $X^b$ is —$X^c$—$X^d$—;

$X^c$ is a divalent organic group containing a heteroatom;

$X^d$ is —CO—$NR^{d2}$—; and $R^{d2}$ is a hydrogen atom or a $C_{1-6}$ alkyl group.

[11] The compound according to any one of [1] to [10], wherein $R^{A1}$ is —$R^{A5}$—$(OR^{Ac})_2$;

$R^{A5}$ is a trivalent hydrocarbon group having 4 to 6 carbon atoms; and $R^{AC}$ is a (meth)acryloyl group.

[12] The compound according to any one of [9] to [11], wherein $X^c$ is $[(R^{c1})_{t1}—(X^{c1})_{t2}]$—$X^{c2}$—;

$R^{c1}$ is each independently at each occurrence a single bond or a $C_{1-12}$ alkylene group;

$X^{c1}$ is each independently at each occurrence O, $NR^{x1}$, S, SO, or $SO_2$;

$R_{x1}$ is each independently at each occurrence a hydrogen atom or a $C_{1-6}$ alkyl group;

$X^{c2}$ is O or $NR^{x2}$;

$R^{x2}$ is each independently at each occurrence a hydrogen atom or a $C_{1-6}$ alkyl group;

t1 is an integer of 1 to 6; and t2 is an integer of 1 to 6, wherein in $[(R^{c1})_{t1}—(X^{c1})_{t2}]$, the occurrence order of $R^{c1}$ and $X^{c1}$ is not limited in the formula.

[13] The compound according to any one of [9] to [12], wherein $X^c$ is —$R^{c1'}$—$X^{c1}$—$R^{c1''}$—$C^{c2}$—;

$R^{c1'}$ is a $C_{1-6}$ alkylene group;

$R^{c1''}$ is a $C_{1-12}$ alkylene group;

$X^{c1}$ is O, $NR^{x1}$, S, SO, or $SO_2$;

$R^{x1}$ is each independently at each occurrence a hydrogen atom or a $C_{1-6}$ alkyl group;

$X^{c2}$ is O or $NR^{x2}$; and $R^{x2}$ is each independently at each occurrence a hydrogen atom or a $C_{1-6}$ alkyl group.

[14] The compound according to any one of [9] to [13], wherein $X^c$ is —$R^{c1'}$—$X^{c1}$—$R^{c1''}$—$X^{c2}$—;

$R^{c1'}$ is a $C_{2-4}$ alkylene group;

$R^{c1''}$ is a $C_{2-12}$ alkylene group;

$X^{c1}$ is S; and $X^{c2}$ is O.

[15] The compound according to any one of [1] to [14], wherein $R^B$ is $R^{A1}$—$X^b$—.

[16] A surface-treating agent comprising:

one or more of the compounds according to any one of [1] to [15].

[17] A curable composition comprising:

the compound according to any one of [1] to [15] or the surface-treating agent according to [16]; and a composition forming a matrix.

[18] An article comprising:

a substrate; and a layer formed on a surface of the substrate by the surface-treating agent according to [16] or the curable composition according to [17].

[19] The article according to [18], wherein the article is an optical member.

EXAMPLES

Hereinafter, the present disclosure will be described with reference to, but is not limited to, Examples. In Examples, all the chemical formulas of the polymers shown below represent average compositions.

Synthesis Example 1

The following perfluoropolyether (PFPE)-containing compound (A) was synthesized according to the method described in Patent Literature 1 (WO2018/056413A1).

PFPE-containing compound (A):

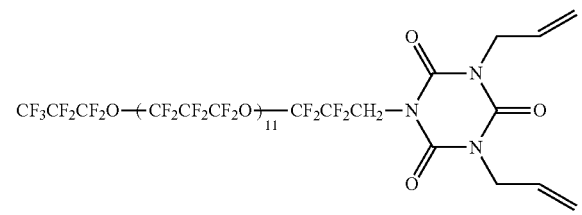

Synthesis Example 2 Method for Producing PFPE-Containing Compound (B)

The PFPE-containing compound (A) (10.0 g) obtained above was dissolved in m-hexafluoroxylene, mercaptoethanol (0.74 g) was added thereto, and the mixture was heated with stirring. The completion of the reaction was confirmed by $^1$H-NMR. Perfluorohexane and acetone were added to the reaction solution for liquid separation, and the lower layer was concentrated, whereby 10.1 g of a PFPE-containing compound (B) was obtained.

PFPE-containing compound (B):

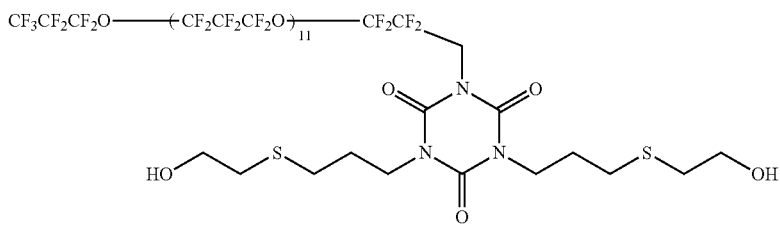

Synthesis Example 3 Method for Producing PFPE-Containing Compound (C)

The PFPE-containing compound (B) (10.0 g) obtained above was dissolved in 1,1,2,2,3,3,4-heptafluorocyclopentane and stirred while heating. di-n-butyltin (IV) dilaurate (6.2 mg) and 1,1-(bisacryloyloxymethyl) ethyl isocyanate (trade name: Karenz BEI (SHOWA DENKO K.K.)) (2.3 g) were further added, and stirring was continued. The completion of the reaction was confirmed by IR and $^1$H-NMR. After adding 2,6 di-t-butyl-p-cresol (7.4 mg) and stirring for a while, propylene glycol monomethyl ether (PGME) was added and the mixture was filtered through a filter, whereby 60.5 g of a solution containing 20 wt % of PFPE-containing compound (C) was obtained.

PFPE-containing compound (C):

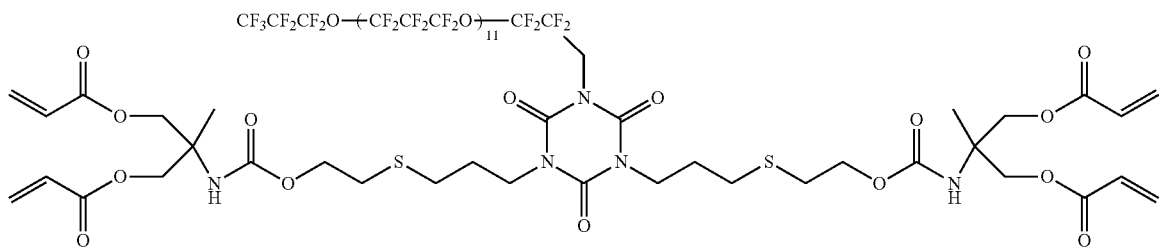

Synthesis Examples 4 to 6 Methods for Producing PFPE-Containing Compound (D), PFPE-Containing Compound (E), PFPE-Containing Compound (F)

Solutions containing the following perfluoropolyether (PFPE)-containing compound (D), PFPE-containing compound (E), and PFPE-containing compound (F) were prepared according to the methods described in Patent Literature 1 (WO2018/056413A1) and Synthesis Examples 2 and 3, respectively.

PFPE-containing compound (D):

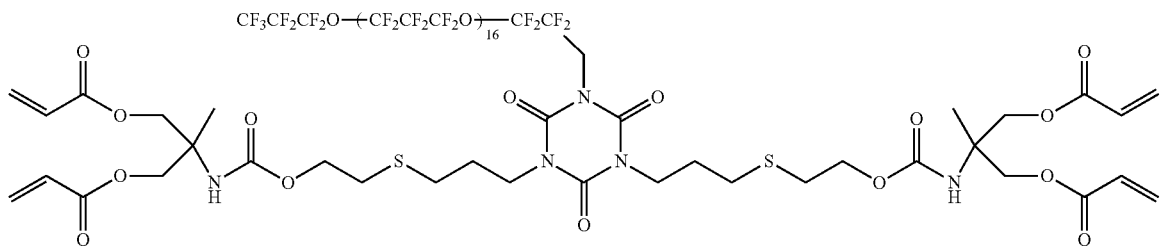

PFPE-containing compound (E):

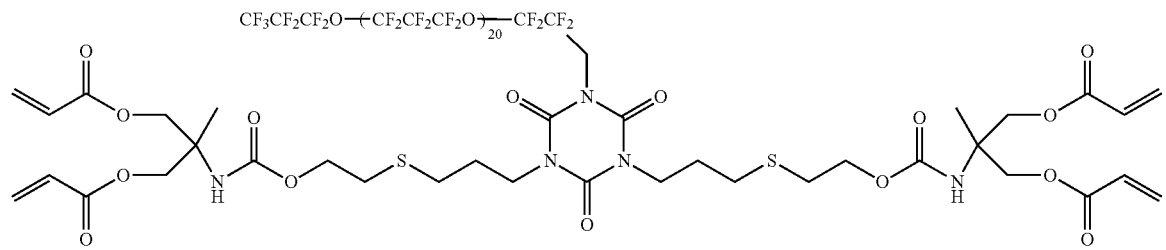

PFPE-containing compound (F):

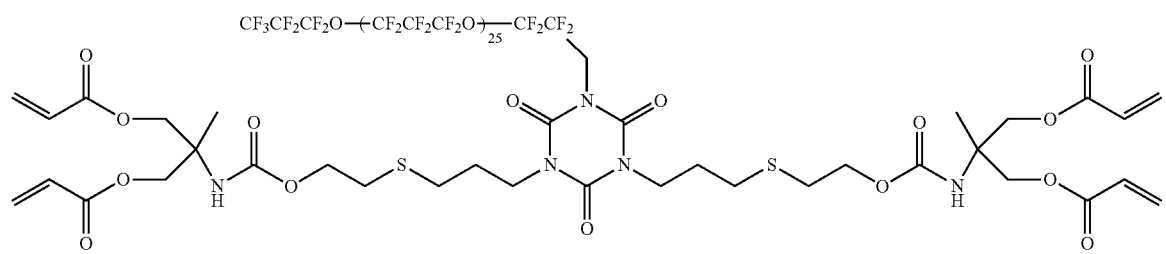

Synthesis Examples 7 and 8 Methods for Producing PFPE-Containing Compound (G) and PFPE-Containing Compound (H)

The following perfluoropolyether (PFPE)-containing compound (G) and PFPE-containing compound (H) were synthesized according to the methods described in Patent Literature 1 (WO2018/056413A1) and Synthesis Example 2, respectively.

PFPE-containing compound (G):

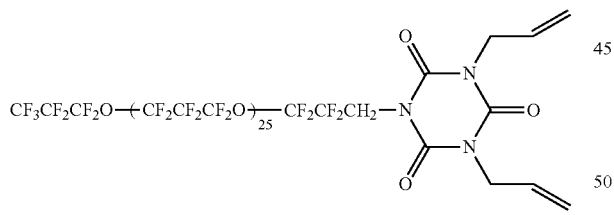

PFPE-containing compound (H):

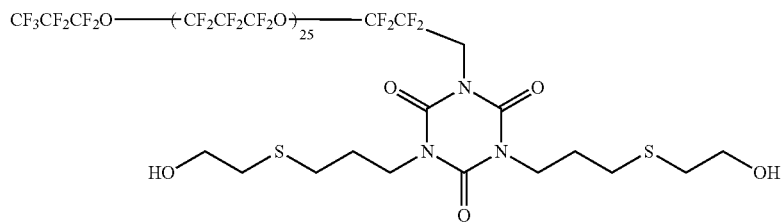

Synthesis Example 9 Method for Producing PFPE-Containing Compound (I)

The PFPE-containing compound (H) (10.0 g) was dissolved in 1,1,2,2,3,3,4-heptafluorocyclopentane and stirred while heating. di-n-butyltin (IV) dilaurate (5.4 mg) and 2-isocyanate ethyl acrylate (trade name: Karenz AOI (SHOWA DENKO K.K.)) (0.70 g) were further added, and stirring was continued. The completion of the reaction was confirmed by IR and $^1$H-NMR. After adding 2,6 di-t-butyl-p-cresol (6.4 mg) and stirring for a while, propylene glycol monomethyl ether (PGME) was added and the mixture was filtered through a filter, whereby 52.9 g of a solution containing 20 wt % of PFPE-containing compound (I) was obtained.

PFPE-containing compound (I):

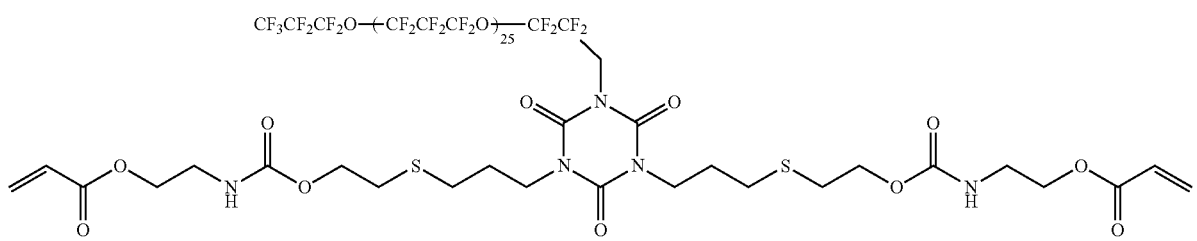

Synthesis Example 10 Method for Producing PFPE-Containing Compound (J)

A PFPE-containing compound (J) was obtained in accordance with the method of Synthesis Example 2 except that the PFPE-containing compound (G) was used instead of the PFPE-containing compound (A) and mercaptopropanol was used instead of mercaptoethanol.

PFPE-containing compound (J):

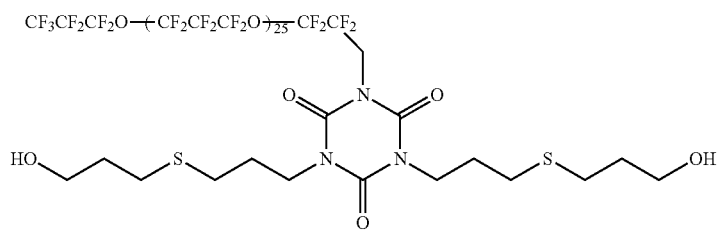

Synthesis Example 11 Method for Producing PFPE-Containing Compound (K)

A solution containing 20 wt % of the PFPE-containing compound (K) was obtained in accordance with the method of Synthesis Example 3 except that the PFPE-containing compound (J) was used instead of the PFPE-containing compound (B).

PFPE-containing compound (K):

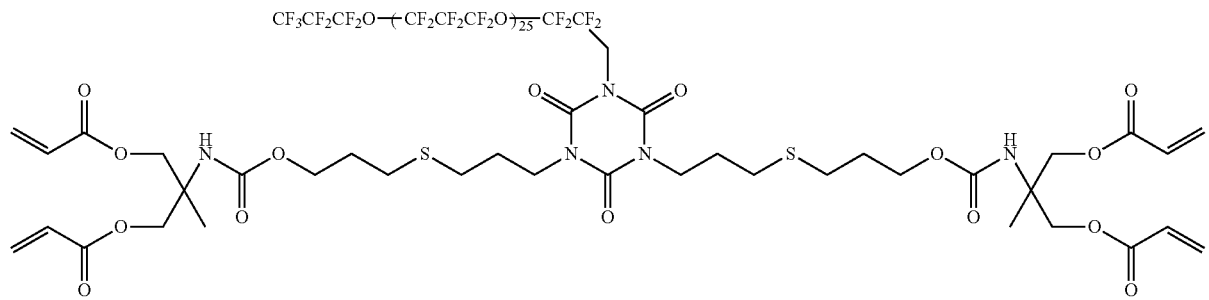

Synthesis Example 12 Method for Producing PFPE-Containing Compound (L)

A solution containing 20 wt % of the PFPE-containing compound (L) was obtained in accordance with the method of Synthesis Example 9 except that the PFPE-containing compound (J) was used instead of the PFPE-containing compound (H).

PFPE-containing compound (L):

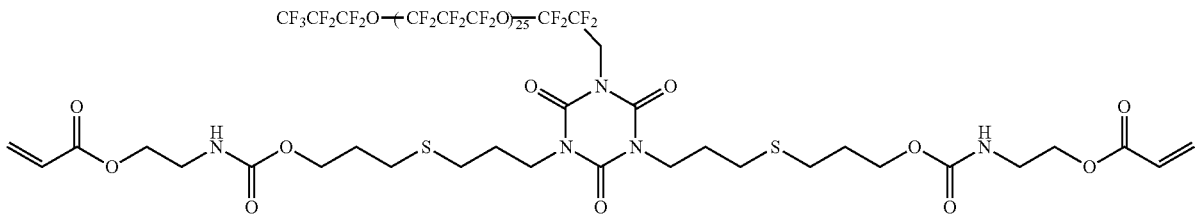

Synthesis Example 13 Method for Producing PFPE-Containing Compound (M)

A PFPE-containing compound (M) was obtained in accordance with the method of Synthesis Example 2 except that the PFPE-containing compound (G) was used instead of the PFPE-containing compound (A) and mercaptohexanol was used instead of mercaptoethanol.

PFPE-containing compound (M):

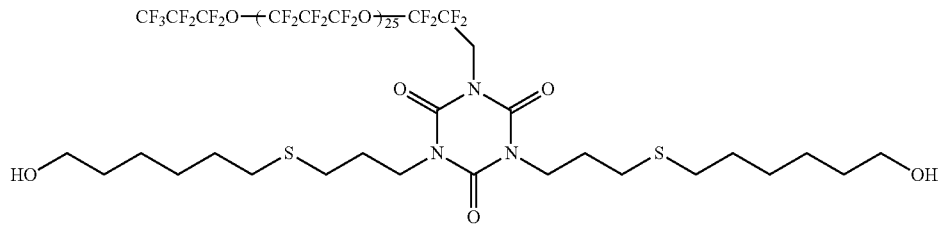

Synthesis Example 14 Method for Producing PFPE-Containing Compound (N)

A solution containing 20 wt % of the PFPE-containing compound (N) was obtained in accordance with the method of Synthesis Example 3 except that the PFPE-containing compound (M) was used instead of the PFPE-containing compound (B).

PFPE-containing compound (N):

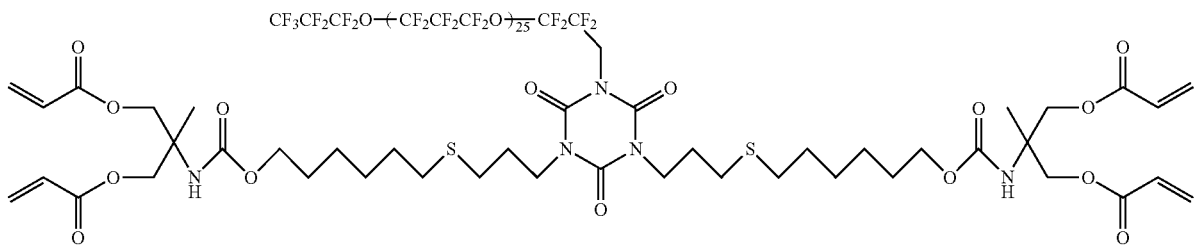

Synthesis Example 15 Method for Producing PFPE-Containing Compound (O)

A solution containing 20 wt % of the PFPE-containing compound (O) was obtained in accordance with the method of Synthesis Example 9 except that the PFPE-containing compound (M) was used instead of the PFPE-containing compound (H).

PFPE-containing compound (O):

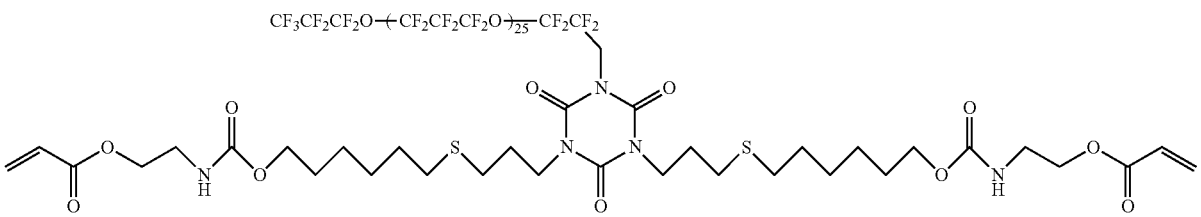

Synthesis Example 16 Method for Producing PFPE-Containing Compound (P)

The PFPE-containing compound (G) (10.0 g) obtained above was dissolved in m-hexafluoroxylene, 4-mercapto-1-butanol (0.53 g) was added thereto, and the mixture was heated with stirring. The completion of the reaction was confirmed by $^1$H-NMR. Perfluorohexane and acetone were added to the reaction solution for liquid separation, and the lower layer was concentrated, whereby 10.2 g of a PFPE-containing compound (P) was obtained.

PFPE-containing compound (P):

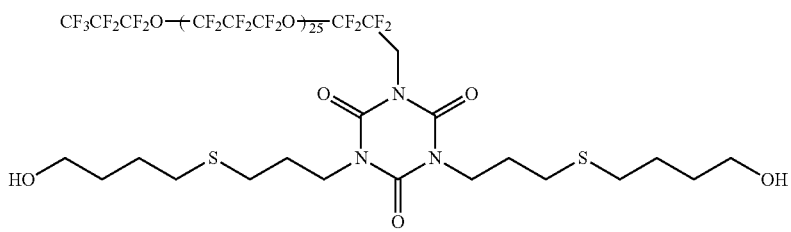

Synthesis Example 17 Method for Producing PFPE-Containing Compound (Q)

The PFPE-containing compound (P) (10.0 g) obtained above was dissolved in 1,1,2,2,3,3,4-heptafluorocyclopentane and stirred while heating. di-n-butyltin (IV) dilaurate (5.7 mg) and 1,1-(bisacryloyloxymethyl) ethyl isocyanate (trade name: Karenz BEI (SHOWA DENKO K.K.)) (1.13 g) were further added, and stirring was continued. The completion of the reaction was confirmed by IR and $^1$H-NMR. After adding 2,6 di-t-butyl-p-cresol (6.8 mg) and stirring for a while, propylene glycol monomethyl ether (PGME) was added and the mixture was filtered through a filter, whereby 54.3 g of a solution containing 20 wt % of PFPE-containing compound (Q) was obtained.

PFPE-containing compound (Q):

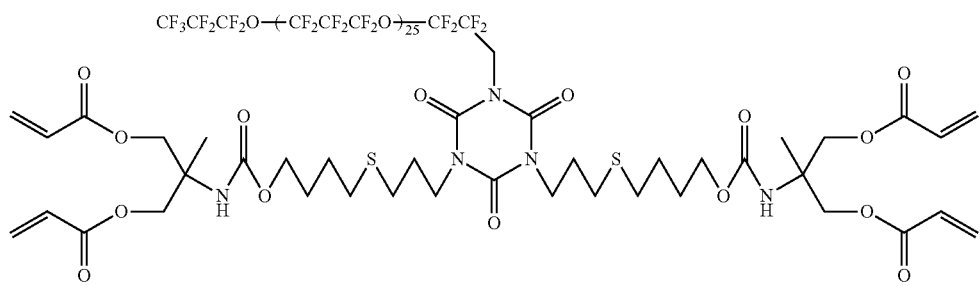

Synthesis Example 18 Method for Producing PFPE-Containing Compound (R)

The PFPE-containing compound (M) (10.0 g) obtained in Synthesis Example 13 was dissolved in 1,1,2,2,3,3,4-heptafluorocyclopentane and stirred while heating. di-n-butyltin (IV) dilaurate (6.6 mg) and 2-(2-methacryloyloxyethyloxy) ethyl isocyanate (trade name: Karenz MOI-EG (SHOWA DENKO K.K.)) (0.94 g) were further added, and stirring was continued. The completion of the reaction was confirmed by IR and $^1$H-NMR. After adding 2,6 di-t-butyl-p-cresol (7.7 mg) and stirring for a while, propylene glycol monomethyl ether (PGME) was added and the mixture was filtered through a filter, whereby 53.3 g of a solution containing 20 wt % of PFPE-containing compound (R) was obtained.

PFPE-containing compound (R):

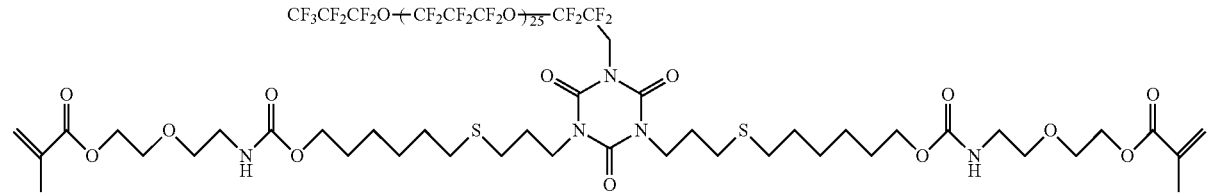

Synthesis Example 19 Method for Producing PFPE-Containing Compound (S)

A solution containing 20 wt % of the PFPE-containing compound (S) was obtained in accordance with the method of Synthesis Example 18 except that the PFPE-containing compound (H) obtained in Synthesis Example 8 was used instead of the PFPE-containing compound (M).

PFPE-containing compound (S):

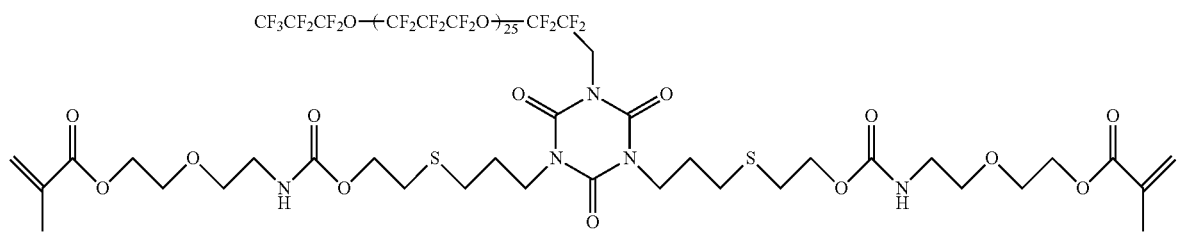

Synthesis Example 20 Method for Producing PFPE-Containing Compound (T)

A PFPE-containing compound (T) was obtained in accordance with the method of Synthesis Example 2 except that the PFPE-containing compound (G) was used instead of the PFPE-containing compound (A) and 9-mercapto-1-nonanol was used instead of mercaptoethanol.

PFPE-containing compound (T):

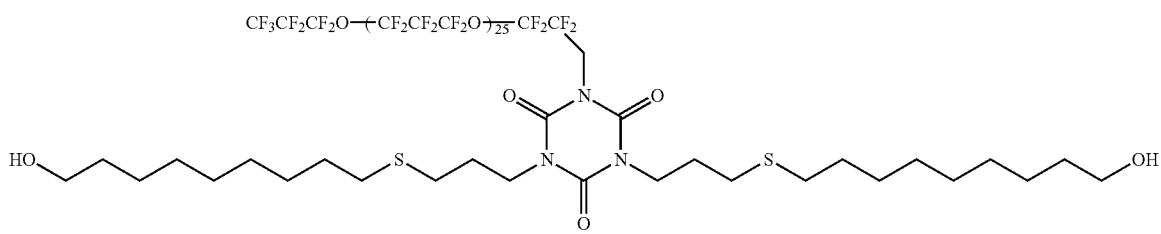

Synthesis Example 21 Method for Producing PFPE-Containing Compound (U)

A solution containing 20 wt % of the PFPE-containing compound (U) was obtained in accordance with the method of Synthesis Example 3 except that the PFPE-containing compound (T) was used instead of the PFPE-containing compound (B) and methyl isobutyl ketone (MIBK) was used instead of propylene glycol monomethyl ether (PGME).

PFPE-containing compound (U):

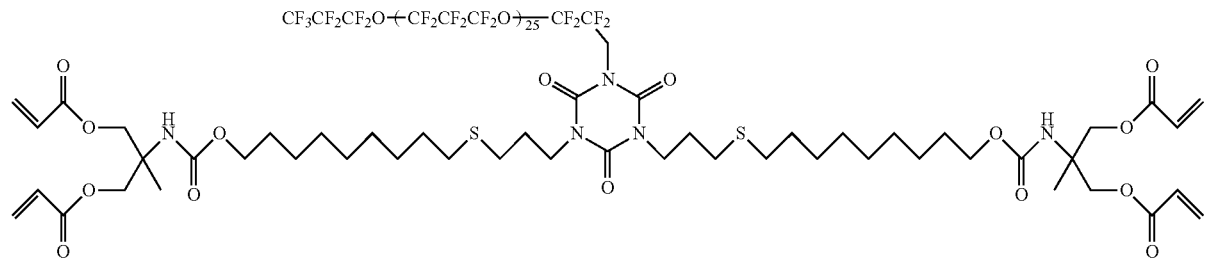

Synthesis Example 22

The following perfluoropolyether (PFPE)-containing compound (V) was synthesized according to the method described in Patent Literature 1 (WO2018/056413A1).

PFPE-containing compound (V):

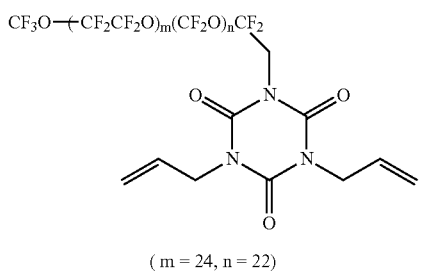

(m = 24, n = 22)

The values of m and n are average values.

Synthesis Example 23 Method for Producing PFPE-Containing Compound (W)

The PFPE-containing compound (V) (10.0 g) obtained above was dissolved in m-hexafluoroxylene, mercaptoethanol (0.41 g) was added thereto, and the mixture was heated with stirring. The completion of the reaction was confirmed by $^1$H-NMR. Perfluorohexane and acetone were added to the reaction solution for liquid separation, and the lower layer was concentrated, whereby 9.5 g of a PFPE-containing compound (W) was obtained.

PFPE-containing compound (W):

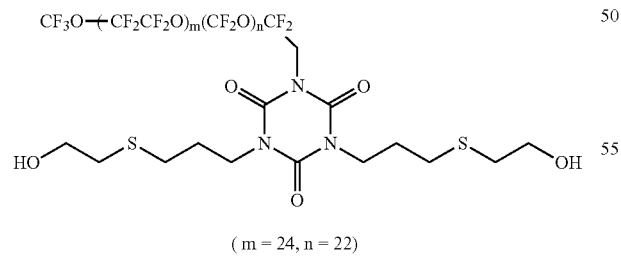

(m = 24, n = 22)

Synthesis Example 24 Method for Producing PFPE-Containing Compound (X)

The PFPE-containing compound (W) (9.0 g) obtained above was dissolved in 1,1,2,2,3,3,4-heptafluorocyclopentane and stirred while heating. di-n-butyltin (IV) dilaurate (5.3 mg) and 1,1-(bisacryloyloxymethyl) ethyl isocyanate (trade name: Karenz BEI (SHOWA DENKO K.K.)) (1.1 g) were further added, and stirring was continued. The completion of the reaction was confirmed by IR and $^1$H-NMR. After adding 2,6 di-t-butyl-p-cresol (6.1 mg) and stirring for a while, methyl isobutyl ketone (MIBK) was added and the mixture was filtered through a filter, whereby 49.5 g of a solution containing 20 wt % of PFPE-containing compound (X) was obtained.

PFPE-containing compound (X):

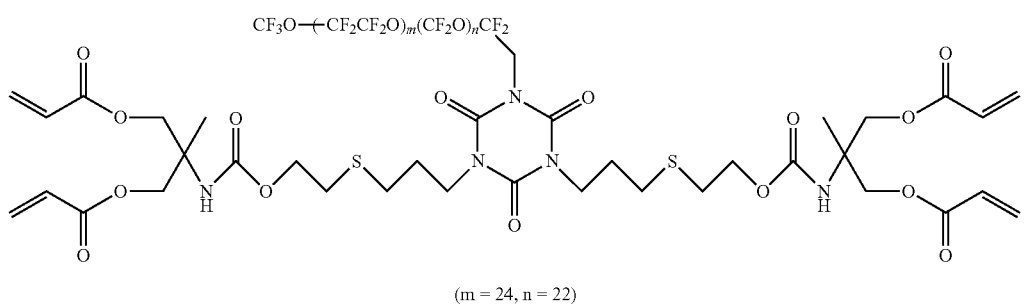

(m = 24, n = 22)

Synthesis Example 25

The following perfluoropolyether (PFPE)-containing compound (Y) was synthesized according to the method described in Patent Literature 1 (WO2018/056413A1).

PFPE-containing compound (Y):

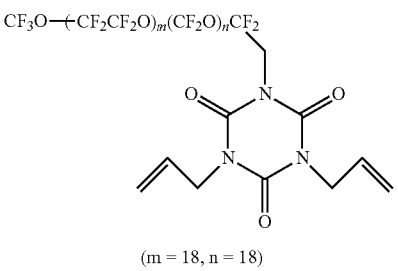

(m = 18, n = 18)

The values of m and n are average values.

Synthesis Example 26 Method for Producing PFPE-Containing Compound (Z)

A PFPE-containing compound (Z) was obtained in accordance with the method of Synthesis Example 23 except that the PFPE-containing compound (Y) was used instead of the PFPE-containing compound (V).

PFPE-containing compound (Z):

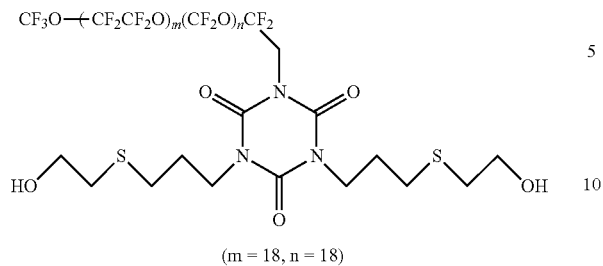

(m = 18, n = 18)

Synthesis Example 27 Method for Producing PFPE-Containing Compound (AA)

A PFPE-containing compound (AA) was obtained in accordance with the method of Synthesis Example 24 except that the PFPE-containing compound (Z) was used instead of the PFPE-containing compound (W).

PFPE-containing compound (AA):

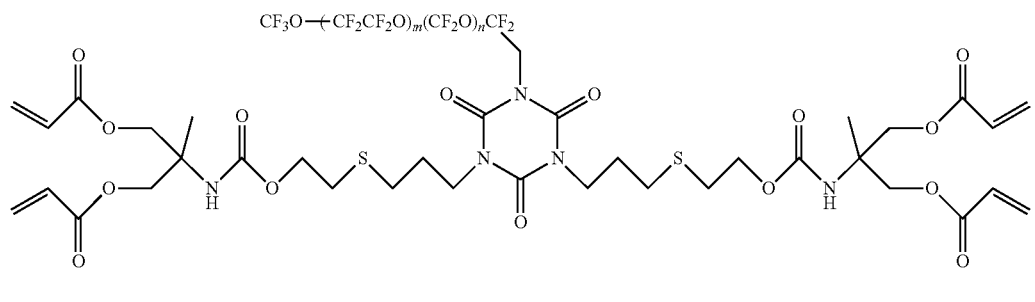

(m = 18, n = 18)

Synthesis Example 28 Method for Producing PFPE-Containing Compound (AB)

A PFPE-containing compound (AB) was obtained in accordance with the method of Synthesis Example 2 except that the PFPE-containing compound (G) was used instead of the PFPE-containing compound (A), 11-mercapto-1-undecanol was used instead of mercaptoethanol, 35 mg of azoisobutyronitrile was added, and heating was performed at 80° C.

PFPE-containing compound (AB):

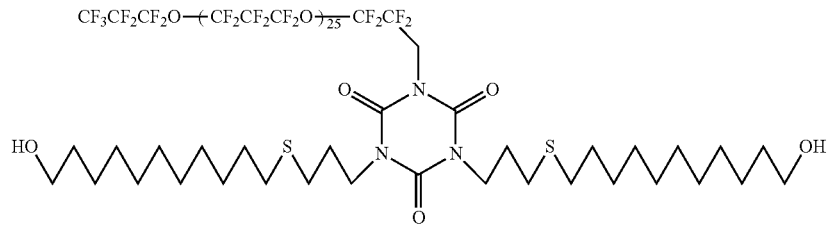

Synthesis Example 29 Method for Producing PFPE-Containing Compound (AC)

A solution containing 20 wt % of the PFPE-containing compound (AC) was obtained in accordance with the method of Synthesis Example 3 except that the PFPE-containing compound (AB) was used instead of the PFPE-containing compound (B) and methyl isobutyl ketone (MIBK) was used instead of propylene glycol monomethyl ether (PGME).

PFPE-containing compound (AC):

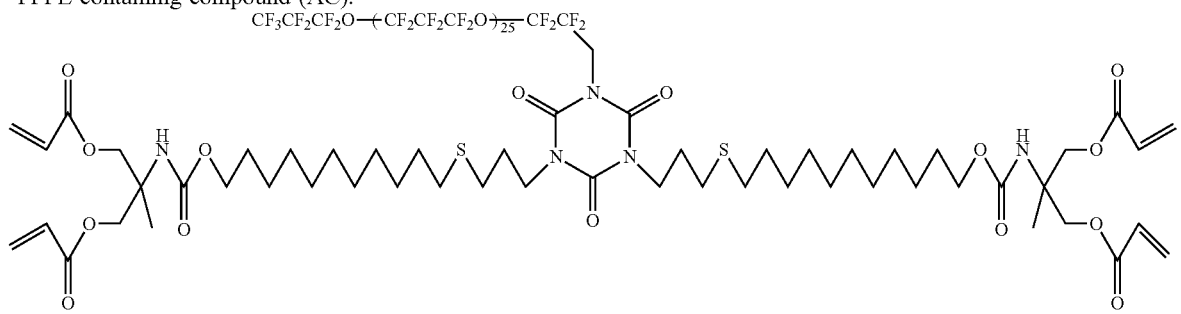

Synthesis Example 30 Method for Producing Mixture Containing PFPE-Containing Compound (AD), PFPE-Containing Compound (H), and PFPE-Containing Compound (AB)

The PFPE-containing compound (G) (10.0 g) was dissolved in m-hexafluoroxylene, 35 mg of azoisobutyronitrile was added thereto, mercaptoethanol (0.18 g) and 11-mercapto-1-undecanol (0.46 g) were simultaneously added thereto, and the mixture was heated to 80° C. with stirring. The completion of the reaction was confirmed by $^1$H-NMR. Perfluorohexane and acetone were added to the reaction solution for liquid separation, and the lower layer was concentrated, whereby 10.0 g of a mixture containing a PFPE-containing compound (AD), PFPE-containing compound (H), and PFPE-containing compound (AB) was obtained.

PFPE-containing compound (AD):

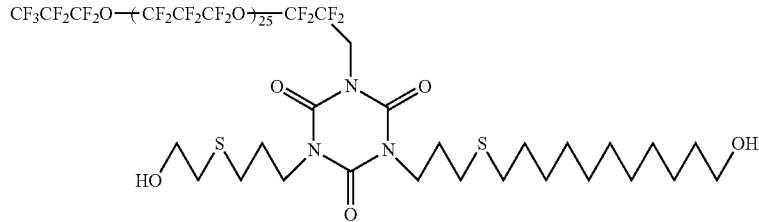

Synthesis Example 31 Method for Producing Mixture Containing PFPE-Containing Compound (AE), PFPE-Containing Compound (F), and PFPE-Containing Compound (AC)

A solution containing 20 wt % of a mixture of a PFPE-containing compound (AE), PFPE-containing compound (F), and PFPE-containing compound (AC) was obtained in accordance with the method of Synthesis Example 3 except that the mixture containing the PFPE-containing compound (AD), PFPE-containing compound (H), and PFPE-containing compound (AB) obtained in Synthesis Example 30 was used and methyl isobutyl ketone (MIBK) was used instead of propylene glycol monomethyl ether (PGME).

PFPE-containing compound (AE):

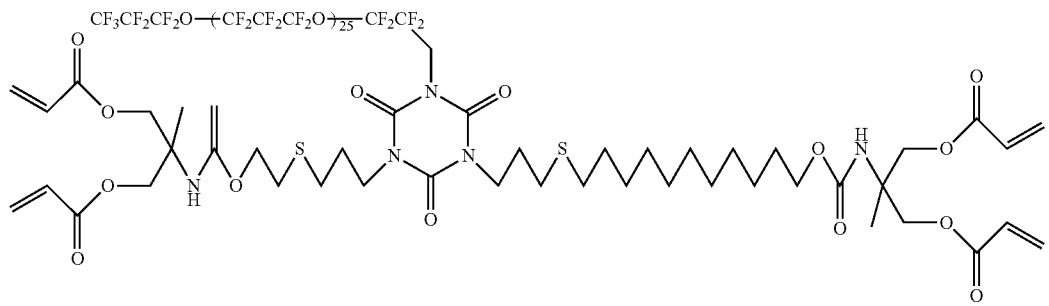

Synthesis Example 32 Method for Producing Mixture Containing PFPE-Containing Compound (AF), PFPE-Containing Compound (M), and PFPE-Containing Compound (T)

The PFPE-containing compound (G) (10.0 g) was dissolved in m-hexafluoroxylene, mercaptohexanol (0.31 g) and 9-mercapto-1-nonanol (0.40 g) was simultaneously added thereto, and the mixture was heated with stirring. The completion of the reaction was confirmed by $^1$H-NMR. Perfluorohexane and acetone were added to the reaction solution for liquid separation, and the lower layer was concentrated, whereby 10.2 g of a mixture containing a PFPE-containing compound (AF), PFPE-containing compound (M), and PFPE-containing compound (T) was obtained.

PFPE-containing compound (AF):

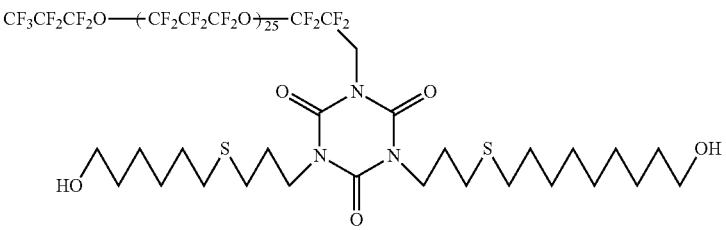

Synthesis Example 33 Method for Producing Mixture Containing PFPE-Containing Compound (AG), PFPE-Containing Compound (N), and PFPE-Containing Compound (U)

A solution containing 20 wt % of a mixture of a PFPE-containing compound (AG), PFPE-containing compound (N), and PFPE-containing compound (U) was obtained in accordance with the method of Synthesis Example 3 except that the mixture containing the PFPE-containing compound (AF), PFPE-containing compound (M), and PFPE-containing compound (T) obtained in Synthesis Example 32 was used and methyl isobutyl ketone (MIBK) was used instead of propylene glycol monomethyl ether (PGME).

PFPE-containing compound (AG):

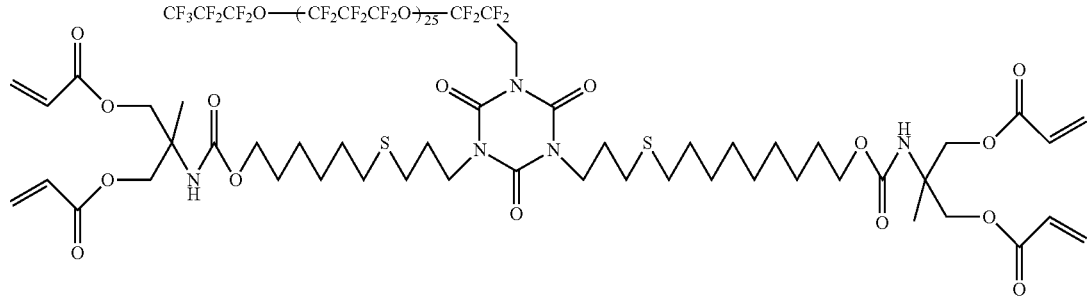

Synthesis Example 34 Method for Producing Mixture Containing PFPE-Containing Compound (G), PFPE-Containing Compound (AH), and PFPE-Containing Compound (AI)

A mixture of the following three PFPE-containing compounds (x), (y), and (z) (weight ratio x: y: z=60:25: 15) was prepared.

(x) $CF_3CF_2CF_2O—(CF_2CF_2CF_2O)_{25}—CF_2CF_2CH_2OH$
(y) $(CF_3CF_2CF_2O—(CF_2CF_2CF_2O)_{25}—CF_2CF_3$
(z) $HOCH_2CF_2CF_2O—(CF_2CF_2CF_2O)_{25}—CF_2CF_2CH_2OH$

From the above mixture, a mixture containing PFPE-containing compound (G), PFPE-containing compound (AH), and PFPE-containing compound (AI) was synthesized according to the method described in Patent Literature 1 (WO2018/056413A1).

PFPE-containing compound (AH):

wherein the PFPE-containing compound (AH) is the PFPE-containing compound (y)

PFPE-containing compound (AI)

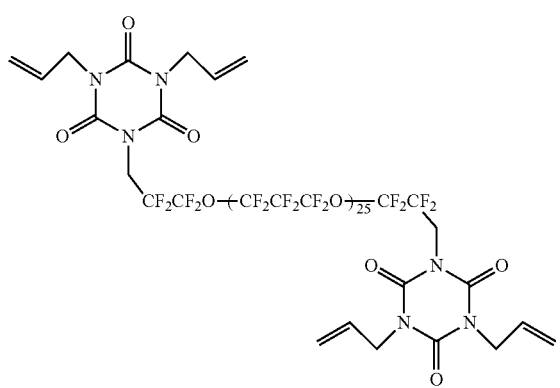

Synthesis Example 35 Method for Producing Mixture Containing PFPE-Containing Compound (M), PFPE-Containing Compound (AH), and PFPE-Containing Compound (AJ)

A mixture (10.0 g) containing the PFPE-containing compound (M), PFPE-containing compound (AH), and PFPE-containing compound (AJ) was obtained in accordance with the method of Synthesis Example 2 except that the mixture (10.0 mg) containing the PFPE-containing compound (G), PFPE-containing compound (AH), and PFPE-containing compound (AI) obtained in Synthesis Example 34 was used instead of the PFPE-containing compound (A), mercaptohexanol was used instead of mercaptoethanol, and azobisisobutyronitrile (80 mg) was further added.

PFPE-containing compound (AJ):

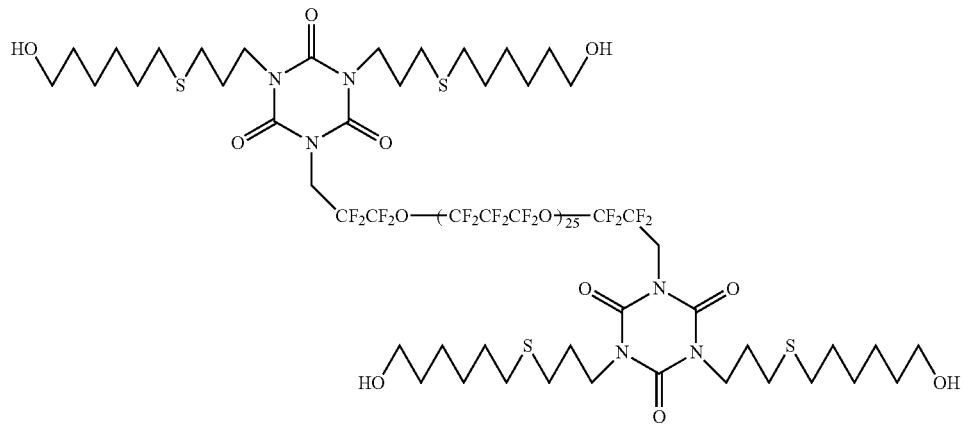

Synthesis Example 36 Method for Producing Mixture Containing PFPE-Containing Compound (N), PFPE-Containing Compound (AH), and PFPE-Containing Compound (AK)

The mixture containing the PFPE-containing compound (M), PFPE-containing compound (AH), and PFPE-containing compound (AJ) (10.0 g) obtained in Synthesis Example 35 was dissolved in 1,1,2,2,3,3,4-heptafluorocyclopentane and stirred while heating. di-n-butyltin (IV) dilaurate (9.5 mg) and 1,1-(bisacryloyloxymethyl) ethyl isocyanate (trade name: Karenz BEI (SHOWA DENKO K.K.)) (1.3 g) were further added, and stirring was continued. The completion of the reaction was confirmed by IR and $^1$H-NMR. After adding 2,6 di-t-butyl-p-cresol (9.5 mg) and stirring for a while, methyl isobutyl ketone (MIBK) was added and the mixture was filtered through a filter, whereby a solution (A) containing 20 wt % of a mixture containing the PFPE-containing compound (N), PFPE-containing compound (AH), and PFPE-containing compound (AK) was obtained. The weight ratio of the PFPE-containing compound (N), PFPE-containing compound (AH) and PFPE-containing compound (AK) in the solution was 61:22:17.

PFPE-containing compound (AK):

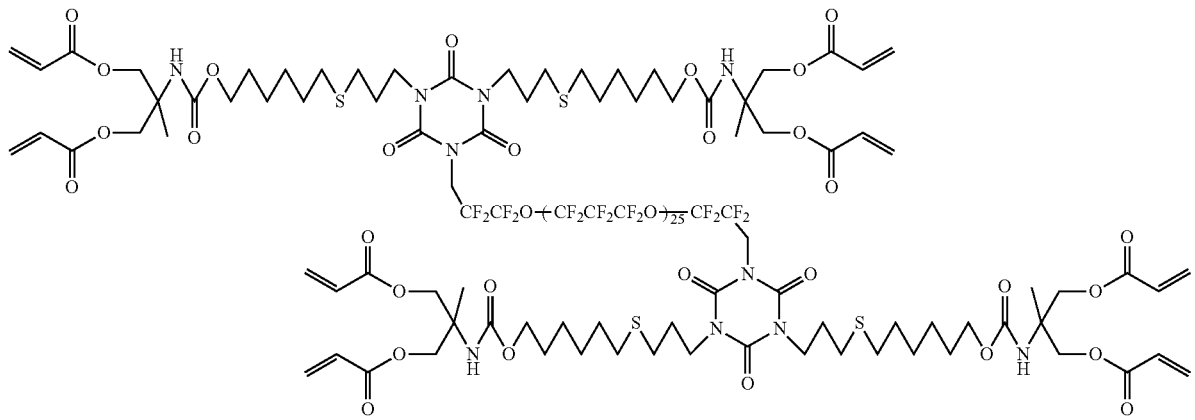

Synthesis Example 37 Method for Producing Mixture Containing PFPE-Containing Compound (T), PFPE-Containing Compound (AH), and PFPE-Containing Compound (AL)

A mixture containing the PFPE-containing compound (T), PFPE-containing compound (AH), and PFPE-containing compound (AL) was obtained in accordance with the method of Synthesis Example 35 except that and 9-mercapto-1-nonanol was added instead of mercaptohexanol.

PFPE-containing compound (AL):

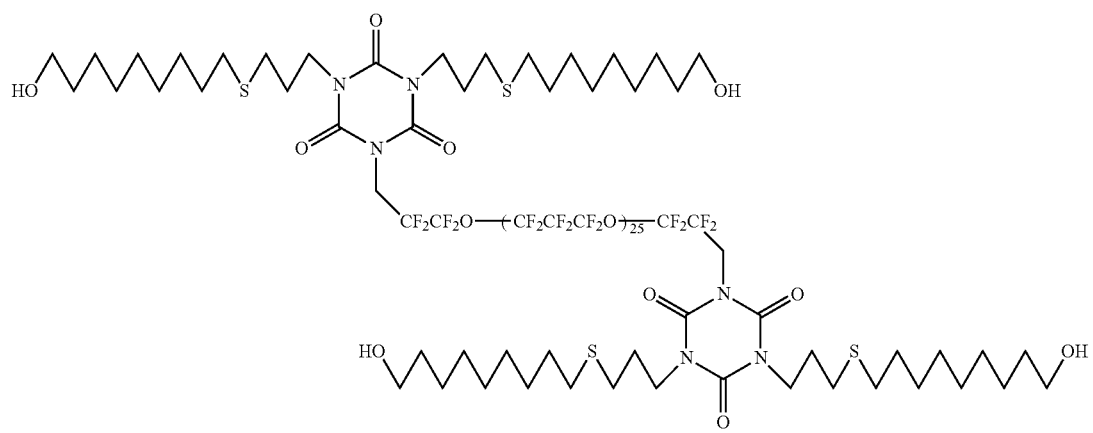

Synthesis Example 38 Method for Producing Mixture Containing PFPE-Containing Compound (U), PFPE-Containing Compound (AH), and PFPE-Containing Compound (AM)

A solution (B) containing 20 wt % of a mixture containing a PFPE-containing compound (U), PFPE-containing compound (AH), and PFPE-containing compound (AM) was obtained in accordance with the method of Synthesis Example 36 except that the mixture containing the PFPE-containing compound (T), PFPE-containing compound (AH), and PFPE-containing compound (AL) obtained in Synthesis Example 37 was used. The weight ratio of the PFPE-containing compound (U), PFPE-containing compound (AH) and PFPE-containing compound (AM) in the solution was 62:22:16.

PFPE-containing compound (AM):

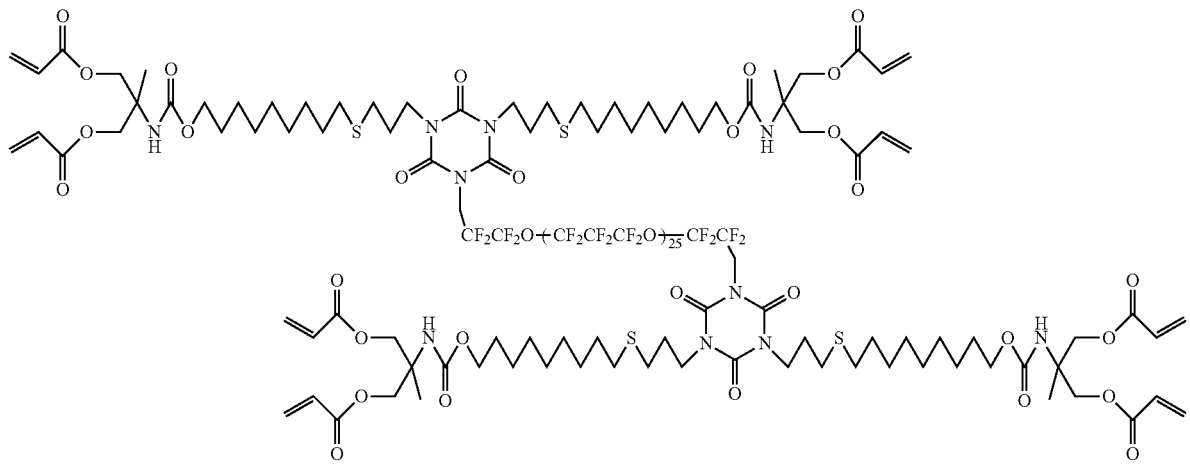

Synthesis Example 39 Method for Producing Mixture Containing PFPE-Containing Compound (U), PFPE-Containing Compound (AH), and PFPE-Containing Compound (AM)

A solution (C) containing 20 wt % of a mixture containing the PFPE-containing compound (U), PFPE-containing compound (AH), and PFPE-containing compound (AM) was obtained in accordance with the method of Synthesis Example 38, except that the catalyst used in Synthesis Example 38 was changed from di-n-butyltin dilaurate (IV) (9.5 mg) to zirconium tetraacetylacetonate (trade name: ZC-700 (Matsumoto Fine Chemical Co., Ltd.) (80.0 mg) and methyl isobutyl ketone (MIBK) to 2-butanone (MEK).

Examples 1 to 21

Beamset 575CB (Arakawa Chemical Industries, Ltd.) (1.5 g) and methyl isobutyl ketone (1.5 g) were mixed, and the PFPE-containing compounds (C), (D), (E), (F), (I), (K), (L), (N), (O), (Q), (R), (S), (U), (X), (AA), (AC), (AE), and (AG) were added in an amount of 0.5% by mass with respect to the beam set 575CB, and the mixture was stirred for 1 hour with a rotary mixer under light shielding to obtain PFPE-containing hard coat materials 1 to 18 (Examples 1 to 18). Further, PFPE-containing hard coat materials 19 to 21 (Examples 19 to 21) were obtained by using the solutions (A) to (C) such that the solid concentration was 0.5% by mass with respect to the beam set 575CB.

Comparative Examples 1 and 2

A hard coat material 22 (Comparative Example 1) was obtained in the same manner as above except that the PFPE-containing compound was changed to DAC-HP (Daikin Industries, Ltd.). Further, a hard coat material 23 (Comparative Example 2) containing only a mixed solution of a beam set 575CB containing no PFPE-containing compound and methyl isobutyl ketone was prepared.
(Evaluation)
<Characteristic Evaluation of Cured Film>
The hard coat materials 1 to 23 (1.0 ml) obtained above were placed on a PET film (Toyobo Co., Ltd., COSMOS-HINE A4100) cut into a size of ¼ of A4 size, and a uniform coating film was formed by bar coater. Each of the obtained coating film was irradiated with a light beam containing UV light of 365 nm under a nitrogen atmosphere at an intensity of 600 mJ/cm$^2$, and each hard coat material was cured to obtain a cured film (surface-treating layer). The initial characteristics of these cured films were measured.

For each cured film, each evaluation was performed by the following method.
(Static Contact Angle)

The static contact angle was measured by the following method using a fully automatic contact angle meter Drop-Master 700 (Kyowa Interface Science Co., Ltd.).
<Measurement Method of Static Contact Angle>

The static contact angle was determined by dropping 2 μL of water or n-hexadecane from a microsyringe onto a horizontally placed substrate and taking a still image 1 second after the drop with a video microscope. The static contact angle with water or n-hexadecane was measured at five different points on the surface-treating layer on the substrate, and the average value thereof was defined as the measured static contact angle. Initial values were measured for the cured films of the PFPE-containing hard coat materials 1 to 21 of Examples 1 to 18 and the hard coat materials 22 and 23 of Comparative Examples 1 and 2, and the results are shown in Table 1.
(Appearance)

The appearance of each cured film was visually observed. The evaluation was based on the following criteria. The results are shown in Table 1.
  G: Transparent
  NG: Cloudy or foreign matters such as fine irregularities on the surface
(Measurement of Haze)

Haze was measured for each cured film. Specifically, using a haze meter (Nippon densyoku, 7000SP), three different points on the substrate were measured by an ASTM-compliant measuring method, and the average value thereof was defined as the measured haze. The measurement results are shown in Table 1.
(Releasability)

The releasability of the cured film was evaluated by a tape peeling test. The evaluation was based on the following criteria. The results are shown in Table 1.
  G: The tape was easily peeled off or did not adhere.
  NG: The adhesive layer of tape adhered.

(Fingerprint Adherability)

A finger was pushed against the cured film, and the ease of adhesion a fingerprint was visually evaluated. The evaluation was based on the following criteria. The results are shown in Table 1.
- G: Fingerprints were less likely to adhere on the cured film, or even when a fingerprint was adhered, it was difficult to see.
- NG: Fingerprints were clearly adhered on the cured film.

(Fingerprint Wiping Property)

After the above fingerprint adherability test, the fingerprint adhered was wiped off five times in a reciprocative manner with KimWipes (trade name, Jujo Kimberly Co., Ltd.), and the ease of wiping off the fingerprint adhered was visually evaluated. The evaluation was based on the following criteria. The results are shown in Table 1.
- G: Fingerprints were completely wiped off.
- NG: The mark of wiping off the fingerprints spread and was difficult to remove.

The results obtained in each evaluation are shown in Table 1.

TABLE 1

| | Static contact angle (degree) | | Appearance | Haze | Releasability | Fingerprint adherability | Fingerprint wiping property |
|---|---|---|---|---|---|---|---|
| | water | n-hexadecane | | | | | |
| Example 1 | 110.2 | 64.5 | G | 0.9 | G | G | G |
| Example 2 | 112.2 | 65.3 | G | 0.9 | G | G | G |
| Example 3 | 113.7 | 66.5 | G | 1.0 | G | G | G |
| Example 4 | 115.1 | 68.1 | G | 1.2 | G | G | G |
| Example 5 | 114.1 | 67.1 | G | 2.5 | G | G | G |
| Example 6 | 114.5 | 67.6 | G | 1.3 | G | G | G |
| Example 7 | 114.9 | 67.9 | G | 2.6 | G | G | G |
| Example 8 | 113.8 | 66.8 | G | 1.1 | G | G | G |
| Example 9 | 114.4 | 67.9 | G | 2.4 | G | G | G |
| Example 10 | 114.1 | 67.1 | G | 1.2 | G | G | G |
| Example 11 | 113.2 | 66.1 | G | 1.3 | G | G | G |
| Example 12 | 114.5 | 67.7 | G | 1.5 | G | G | G |
| Example 13 | 113.9 | 66.9 | G | 0.9 | G | G | G |
| Example 14 | 113.6 | 66.5 | G | 2.2 | G | G | G |
| Example 15 | 111.8 | 64.9 | G | 1.9 | G | G | G |
| Example 16 | 113.2 | 65.9 | G | 1.1 | G | G | G |
| Example 17 | 112.9 | 65.6 | G | 1.2 | G | G | G |
| Example 18 | 113.3 | 66.4 | G | 0.9 | G | G | G |
| Example 19 | 113.4 | 66.4 | G | 0.9 | G | G | G |
| Example 20 | 113.5 | 66.5 | G | 0.8 | G | G | G |
| Example 21 | 113.5 | 66.5 | G | 0.8 | G | G | G |
| Comparative Example 1 | 109.1 | 64.2 | NG | 1.4 | G | G | G |
| Comparative Example 2 | 63.2 | 7.6 | G | 0.9 | NG | NG | NG |

(Steel Wool (SW) Friction Durability Evaluation)

Steel wool friction durability was evaluated for each cured film. Specifically, the substrate having a surface-treating layer formed thereon was placed horizontally, and then, a steel wool (grade No. 0000, 5 mm×10 mm×10 mm) was brought into contact with the surface treatment layer of the substrate, a load of 1,000 gf was applied thereon, and then the steel wool was reciprocated at a speed of 53.3 mm/sec (friction speed 40 rpm) while the load was applied. The static contact angle (degree) of water was measured every 500 round trips, and the evaluation was stopped when the measured value of the contact angle became less than 100 degrees. Table 2 shows the number of round trips when the contact angle finally exceeded 100 degrees.

(Eraser Friction Durability Evaluation)

The friction durability of each cured film was evaluated by an eraser friction durability test. Specifically, the sample article on which the surface-treating layer is formed was placed horizontally, an eraser (Minoan, hardness 81 (Durometer A type), circular surface dimension 0.6 cm in diameter) was brought into contact with the surface of the surface-treating layer, a load of 1,000 gf was applied thereon, and then the eraser was reciprocated at a speed of 48 mm/sec (friction speed 40 rpm) while the load was applied. The static contact angle (degree) of water was measured every 500 round trips. The evaluation was stopped when the measured value of the contact angle became less than 100 degrees. Table 2 shows the number of round trips when the contact angle finally exceeded 100 degrees.

TABLE 2

| | SW friction durability (times) | Eraser friction durability (times) |
|---|---|---|
| Example 1 | 2000 | 5500 |
| Example 2 | 2500 | 7000 |
| Example 3 | 3500 | 8000 |

TABLE 2-continued

| | SW friction durability (times) | Eraser friction durability (times) |
|---|---|---|
| Example 4 | 5500 | 12000 |
| Example 5 | 6500 | 14000 |
| Example 6 | 6000 | 13000 |
| Example 7 | 6000 | 14000 |
| Example 8 | 4000 | 11000 |
| Example 9 | 6500 | 14000 |
| Example 10 | 4000 | 9000 |
| Example 11 | 3000 | 8000 |
| Example 12 | 4000 | 8000 |
| Example 13 | 4500 | 10000 |
| Example 14 | 3500 | 6500 |
| Example 15 | 2500 | 5000 |
| Example 16 | 3500 | 9000 |
| Example 17 | 5000 | 10000 |
| Example 18 | 3000 | 11000 |

TABLE 2-continued

| | SW friction durability (times) | Eraser friction durability (times) |
|---|---|---|
| Example 19 | 3500 | 7000 |
| Example 20 | 3500 | 9500 |
| Example 21 | 3500 | 9500 |
| Comparative Example 1 | 2000 | 3000 |

As can be understood from the results in Table 1 above, the treated substrates having cured films obtained from the hard coat materials of Examples 1 to 21 containing the fluorine-containing isocyanul compound of the present disclosure had a transparent and beautiful appearance. Furthermore, the treated substrates exhibited excellent water-repellency and oil-repellency, and was excellent in releasability, fingerprint adherability and fingerprint wiping property.

Furthermore, as can be understood from the results in Table 2 above, the surface-treating layers obtained from the hard coat materials of Examples 1 to 21 were excellent in the friction durability of steel wool (SW) and an eraser.

On the other hand, in the treated substrate having a cured film obtained from the hard coat material of Comparative Example 1, foreign matters such as fine irregularities were visually observed on the surface of the cured film, and a sufficiently satisfactory result was not obtained in terms of friction durability.

From the above results, it was confirmed that the surface-treating agent of the present disclosure can form a transparent and beautiful film as compared with conventional products, and that a surface-treating layer obtained from the surface-treating agent can exhibit a high level of friction durability.

INDUSTRIAL APPLICABILITY

The fluorine-containing isocyanul compound of the present disclosure and the surface-treating agent containing the fluorine-containing isocyanul compound can be widely used for various resin substrates in applications where antifouling properties are required.

What is claimed is:

1. A compound of the following formula (1):

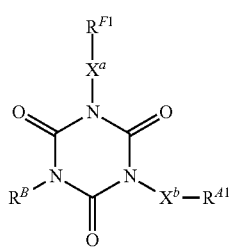

(1)

wherein:
$R^{F1}$ is $Rf^1$—$R^F$—$O_q$—;
$Rf^1$ is a $C_{1-16}$ alkyl group optionally substituted with one or more fluorine atoms;
$R^F$ is a divalent fluoropolyether group;
q is 0 or 1;
$X^a$ is a single bond or divalent organic group;
$R^{A1}$ is —$R^{A6}$—$R^{A4}$—$OR^{AC}$ or —$R^{A6}$—$R^{A5}$—$(OR^{AC})_2$;
$R^{A4}$ is a $C_{1-10}$ alkylene group;
$R^{A5}$ is a trivalent hydrocarbon group having 1 to 10 carbon atoms;
$R^{A6}$ is a single bond or —$C_{1-10}$ alkylene-O—;
$R^{Ac}$ is a (meth)acryloyl group;
$X^b$ is —$X^c$—$X^d$—;
$X^c$ is —$[(R^{c1})_{t1}$—$(X^{c1})_{t2}]$—$X^{c2}$—;
$R^{c1}$ is each independently at each occurrence a single bond or a $C_{1-12}$ alkylene group;
$X^{c1}$ is each independently at each occurrence O, $NR^{x1}$, S, SO, or $SO_2$;
$R^{x1}$ is each independently at each occurrence a hydrogen atom or a $C_{1-6}$ alkyl group;
$X^{c2}$ is O or $NR^{x2}$;
$R^{x2}$ is each independently at each occurrence a hydrogen atom or a $C_{1-6}$ alkyl group;
t1 is an integer of 1 to 6; and
t2 is an integer of 1 to 6,
wherein in $[(R^{c1})_{t1}$—$(X^{c1})_{t2}]$, the occurrence order of $R^{c1}$ and $X^{c1}$ is not limited in the formula;
$X^d$ is —CO—$NR^{d2}$—, —OCO—$NR^{d2}$—, —$NR^{d2}$—CO—, or —$NR^{d2}$—COO—;
$R^{d2}$ is a hydrogen atom or a $C_{1-6}$ alkyl group; and
$R^B$ is $R^{F1}$—$X^a$— or $R^{A1}$—$X^b$—.

2. The compound according to claim 1,
wherein $R^F$ is each independently a group of the formula:

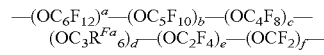

wherein $R^{Fa}$ is each independently at each occurrence a hydrogen atom, a fluorine atom, or a chlorine atom; and
a, b, c, d, e, and f are each independently an integer of 0 to 200, the sum of a, b, c, d, e, and f is 1 or more, and the occurrence order of the respective repeating units in parenthesis with a, b, c, d, e, or f, is not limited in the formula.

3. The compound according to claim 2, wherein $R^{Fa}$ is a fluorine atom.

4. The compound according to claim 1,
wherein $X^a$ is a group of the following formula:

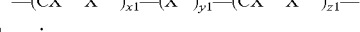

wherein
$X^{121}$ to $X^{124}$ are each independently H, F, OH, or —OSi$(OR^{121})_3$, where three $R^{121}$ are each independently an alkyl group having 1 to 4 carbon atoms;
$X^{a1}$ is —C(=O)NH—, —NHC(=O)—, —O—, —C(=O)O—, —OC(=O)—, —OC(=O)O—, or —NHC(=O)NH—, wherein the left side of each bond is bonded to $CX^{121}X^{122}$; and
x1 is an integer of 0 to 10, y1 is 0 or 1, and z1 is an integer of 1 to 10.

5. The compound according to claim 1,
wherein $X^a$ is a group of —$(CH_2)_{m22}$—, wherein m22 is an integer of 1 to 3.

6. The compound according to claim 1,
wherein $R^{A1}$ is —$R^{A4}$—$OR^{AC}$ or —$R^{A5}$—$(OR^{AC})_2$;
$R^{A4}$ is a $C_{1-10}$ alkylene group;
$R^{A5}$ is a trivalent hydrocarbon group having 1 to 10 carbon atoms; and
$R^{AC}$ is a (meth)acryloyl group.

7. The compound according to claim 1,
wherein $X^b$ is —$X^c$—$X^d$—;
$X^c$ is each independently at each occurrence O, $NR^{x1}$, S, SO, or $SO_2$;
$X^d$ is —CO—$NR^{d2}$—, —OCO—$NR^{d2}$—, —$NR^{d2}$—CO—, or —$NR^{d2}$—COO—; and
$R^{d2}$ is a hydrogen atom or a $C_{1-6}$ alkyl group.

8. The compound according to claim 1,
wherein $R^{A1}$ is $-R^{A5}-(OR^{AC})_2$;
$R^{A5}$ is a trivalent hydrocarbon group having 4 to 6 carbon atoms; and
$R^{AC}$ is a (meth)acryloyl group.

9. The compound according to claim 1,
wherein $X^c$ is $-R^{c1'}-X^{c1}-R^{c1''}-X^{c2}-$;
$R^{c1'}$ is a $C_{1-6}$ alkylene group;
$R^{c1''}$ is a $C_{1-12}$ alkylene group;
$X^{c1}$ is O, $NR^{x1}$, S, SO, or $SO_2$;
$R^{x1}$ is each independently at each occurrence a hydrogen atom or a $C_{1-6}$ alkyl group;
$X^{c2}$ is O or $NR^{x2}$; and
$R^{x2}$ is each independently at each occurrence a hydrogen atom or a $C_{1-6}$ alkyl group.

10. The compound according to claim 1,
wherein $X^c$ is $-R^{c1'}-X^{c1}-R^{c1''}-X^{c2}-$;
$R^{c1'}$ is a $C_{2-4}$ alkylene group;
$R^{c1''}$ is a $C_{2-12}$ alkylene group;
$X^{c1}$ is S; and
$X^{c2}$ is O.

11. The compound according to claim 1,
wherein $R^B$ is $R^{A1}-X^b-$.

\* \* \* \* \*